United States Patent
Haimerl et al.

(10) Patent No.: US 6,832,834 B2
(45) Date of Patent: Dec. 21, 2004

(54) METHOD FOR COMPUTING A PROGRESSIVE SPECTACLE LENS AND METHODS FOR MANUFACTURING A SPECTACLE LENS OF THIS KIND

(75) Inventors: Walter Haimerl, Munich (DE); Herbert Pfeiffer, Munich (DE); Gregor Esser, Munich (DE); Helmut Altheimer, Lauchdorf (DE)

(73) Assignee: Rodenstock GmbH, Munich (DE)

( * ) Notice: Subject to any disclaimer, the term of this patent is extended or adjusted under 35 U.S.C. 154(b) by 47 days.

(21) Appl. No.: 10/280,091

(22) Filed: Oct. 25, 2002

(65) Prior Publication Data

US 2003/0117578 A1 Jun. 26, 2003

Related U.S. Application Data

(63) Continuation of application No. PCT/DE01/01579, filed on Apr. 25, 2001.

(30) Foreign Application Priority Data

Apr. 25, 2000 (DE) .......................................... 100 20 244
Apr. 28, 2000 (DE) .......................................... 100 21 047
Jan. 17, 2001 (DE) ............................... PCT/DE01/00188

(51) Int. Cl.[7] ................................................ G02C 7/06
(52) U.S. Cl. ........................................ 351/161; 351/177
(58) Field of Search ................................ 351/168–172, 351/177

(56) References Cited

U.S. PATENT DOCUMENTS 5,784,144 A 7/1998 Kelch et al.
5,992,998 A 11/1999 Pfeiffer et al.
6,302,540 B1 * 10/2001 Katzman et al. ............ 351/161

* cited by examiner

Primary Examiner—Scott J. Sugarman
(74) Attorney, Agent, or Firm—Crowell & Moring LLP

(57) ABSTRACT

A method for computing a spectacle lens, which includes a region (distance portion) designed for viewing at large distances and in particular "to infinity", a region (near portion) designed for viewing at short distances and in particular "reading distances," and a progressive zone disposed between the distance portion and the near portion, in which the power of the spectacle lens increases, from a value at a distance reference point located in the distance portion to a value at the near reference point located in the near portion along a curve (principal line) veering towards the nose, by an amount designated as addition power. The method includes the steps of stipulating as initial parameters a course of a projection $x_0(y)$ of the principal line on an x,y plane, and also properties of the spectacle lens along the principal line whilst taking into account spherical, cylindrical, and possibly also prismatic prescription values and the addition power, as well as an interpupillary distance, and computing with these stipulations at least one strip of second order on a progressive surface of the spectacle lens, stipulating an object-distance function $Al(y)$ which describes a change of object distance with a movement, in particular a lowering, of a glance, determining on each horizontal meridian of the progressive spectacle lens a point of penetration of a principal ray through the progressive surface, for which point a distance of a point of intersection of this principal ray with a plane which bisects the interpupillary distance is equal to the object distance given by the object-distance function $Al(y)$, computing for the entirety of these points of penetration lying on the principal viewing line a course of the projection $x'_0(y)$ on the x,y plane, equating the course $x_0(y)$ to $x'_0(y)$ and checking the coincidence, subsequently iteratively repeating the steps a. to e. until the projection $x_0(y)$ of the principal line is equal (within given limits) to the course of the principal viewing line projection $x'_0(y)$ used for the computation of the respective surface.

20 Claims, 44 Drawing Sheets

Pfeilhöhen:

| 0 | -20 | -17,5 | -15 | -12,5 | -10 | -7,5 | -5 | -2,5 | 0 |
|---|---|---|---|---|---|---|---|---|---|
| 20 | 0 | 0 | 0 | 0 | 0 | 0 | 0 | 0 | 1,88114 |
| 17,5 | 0 | 0 | 0 | 0 | 0 | 1,727544 | 1,572749 | 1,476457 | 1,43867 |
| 15 | 0 | 0 | 0 | 1,826893 | 1,556258 | 1,343761 | 1,189465 | 1,093506 | 1,055966 |
| 12,5 | 0 | 0 | 1,827844 | 1,500623 | 1,231244 | 1,019591 | 0,865786 | 0,770078 | 0,732707 |
| 10 | 0 | 0 | 1,558189 | 1,232921 | 0,965089 | 0,754524 | 0,601373 | 0,505935 | 0,468649 |
| 7,5 | 0 | 1,726383 | 1,345574 | 1,022576 | 0,756795 | 0,547868 | 0,39579 | 0,300844 | 0,263672 |
| 5 | 0 | 1,566588 | 1,188478 | 0,868198 | 0,605063 | 0,398525 | 0,248337 | 0,154463 | 0,117588 |
| 2,5 | 0 | 1,459495 | 1,084527 | 0,767617 | 0,508048 | 0,305076 | 0,15802 | 0,066273 | 0,030092 |
| 0 | 1,833183 | 1,402774 | 1,031483 | 0,718726 | 0,463772 | 0,26566 | 0,123183 | 0,035027 | 0,00048 |
| -2,5 | 0 | 1,394456 | 1,027487 | 0,719736 | 0,470458 | 0,278427 | 0,141793 | 0,058484 | 0,026833 |
| -5 | 0 | 1,432945 | 1,070942 | 0,768862 | 0,525984 | 0,340808 | 0,210844 | 0,133162 | 0,105213 |
| -7,5 | 0 | 1,51707 | 1,160674 | 0,864715 | 0,628528 | 0,450405 | 0,32724 | 0,255205 | 0,230946 |
| -10 | 0 | 0 | 1,296365 | 1,00678 | 0,777293 | 0,605921 | 0,488983 | 0,42183 | 0,400599 |
| -12,5 | 0 | 0 | 1,479087 | 1,195879 | 0,972726 | 0,807223 | 0,695213 | 0,631598 | 0,61234 |
| -15 | 0 | 0 | 0 | 1,43296 | 1,214957 | 1,053701 | 0,944992 | 0,883608 | 0,86536 |
| -17,5 | 0 | 0 | 0 | 0 | 0 | 1,344445 | 1,237531 | 1,177299 | 1,159499 |
| -20 | 0 | 0 | 0 | 0 | 0 | 0 | 0 | 0 | 1,494969 |

| 0 | 2,5 | 5 | 7,5 | 10 | 12,5 | 15 | 17,5 | 20 |
|---|---|---|---|---|---|---|---|---|
| 20 | 0 | 0 | 0 | 0 | 0 | 0 | 0 | 0 |
| 17,5 | 1,459338 | 1,538288 | 1,675159 | 0 | 0 | 0 | 0 | 0 |
| 15 | 1,076827 | 1,155872 | 1,292618 | 1,4865 | 1,737064 | 0 | 0 | 0 |
| 12,5 | 0,753727 | 0,832805 | 0,969293 | 1,162491 | 1,41186 | 1,717203 | 0 | 0 |
| 10 | 0,489795 | 0,568789 | 0,704732 | 0,896843 | 1,144544 | 1,447722 | 0 | 0 |
| 7,5 | 0,28482 | 0,36345 | 0,498312 | 0,688619 | 0,933952 | 1,234434 | 1,590531 | 0 |
| 5 | 0,138583 | 0,216248 | 0,349126 | 0,536661 | 0,778744 | 1,075794 | 1,428451 | 0 |
| 2,5 | 0,050725 | 0,126539 | 0,256119 | 0,439446 | 0,677017 | 0,969632 | 1,318088 | 0 |
| 0 | 0,020498 | 0,093392 | 0,218221 | 0,395724 | 0,62728 | 0,914254 | 1,257604 | 1,658066 |
| -2,5 | 0,046199 | 0,115437 | 0,23443 | 0,404667 | 0,628679 | 0,908687 | 1,245883 | 0 |
| -5 | 0,124484 | 0,189993 | 0,302891 | 0,46531 | 0,680802 | 0,952663 | 1,282563 | 0 |
| -7,5 | 0,250899 | 0,313413 | 0,420938 | 0,576172 | 0,783244 | 1,046462 | 1,368183 | 0 |
| -10 | 0,421421 | 0,482323 | 0,585923 | 0,735457 | 0,935213 | 1,190203 | 0 | 0 |
| -12,5 | 0,633866 | 0,694298 | 0,795689 | 0,941459 | 1,135746 | 1,383841 | 0 | 0 |
| -15 | 0,887307 | 0,947892 | 1,048564 | 1,192212 | 1,38304 | 0 | 0 | 0 |
| -17,5 | 1,181972 | 1,242623 | 1,343387 | 0 | 0 | 0 | 0 | 0 |
| -20 | 0 | 0 | 0 | 0 | 0 | 0 | 0 | 0 |

*Fig. 7a*

Pfeilhöhen:

| 0 | -20 | -17,5 | -15 | -12,5 | -10 | -7,5 | -5 | -2,5 | 0 |
|---|---|---|---|---|---|---|---|---|---|
| 20 | 0 | 0 | 0 | 0 | 0 | 0 | 0 | 0 | 1,863159 |
| 17,5 | 0 | 0 | 0 | 0 | 0 | 1,713431 | 1,559597 | 1,463879 | 1,426279 |
| 15 | 0 | 0 | 0 | 1,814691 | 1,545607 | 1,334283 | 1,180808 | 1,085335 | 1,047946 |
| 12,5 | 0 | 0 | 1,817928 | 1,492398 | 1,224321 | 1,013638 | 0,860507 | 0,765194 | 0,727941 |
| 10 | 0 | 0 | 1,551597 | 1,22773 | 0,960937 | 0,751121 | 0,598481 | 0,503342 | 0,466141 |
| 7,5 | 0 | 1,720774 | 1,34152 | 1,019638 | 0,754625 | 0,546206 | 0,394455 | 0,2997 | 0,262583 |
| 5 | 0 | 1,563111 | 1,186309 | 0,866888 | 0,604259 | 0,397983 | 0,247914 | 0,154101 | 0,117244 |
| 2,5 | 0 | 1,457542 | 1,083694 | 0,76743 | 0,50814 | 0,305203 | 0,158065 | 0,066241 | 0,030034 |
| 0 | 1,830565 | 1,40174 | 1,031453 | 0,719197 | 0,464364 | 0,266129 | 0,123429 | 0,035094 | 0,000481 |
| -2,5 | 0 | 1,393647 | 1,027636 | 0,720335 | 0,471125 | 0,278936 | 0,142058 | 0,058561 | 0,028885 |
| -5 | 0 | 1,431506 | 1,070482 | 0,768893 | 0,528155 | 0,340932 | 0,210884 | 0,133127 | 0,105253 |
| -7,5 | 0 | 1,513968 | 1,158641 | 0,863288 | 0,627413 | 0,449478 | 0,326492 | 0,254673 | 0,230694 |
| -10 | 0 | 0 | 1,291739 | 1,002913 | 0,773978 | 0,603099 | 0,486693 | 0,420087 | 0,399381 |
| -12,5 | 0 | 0 | 1,470987 | 1,18868 | 0,96833 | 0,801624 | 0,690475 | 0,6277 | 0,609175 |
| -15 | 0 | 0 | 0 | 1,421637 | 1,204619 | 1,044387 | 0,936771 | 0,876431 | 0,859052 |
| -17,5 | 0 | 0 | 0 | 0 | 0 | 1,330393 | 1,224673 | 1,165587 | 1,148724 |
| -20 | 0 | 0 | 0 | 0 | 0 | 0 | 0 | 0 | 1,478348 |

| 0 | 2,5 | 5 | 7,5 | 10 | 12,5 | 15 | 17,5 | 20 |
|---|---|---|---|---|---|---|---|---|
| 20 | 0 | 0 | 0 | 0 | 0 | 0 | 0 | 0 |
| 17,5 | 1,446742 | 1,525089 | 1,660948 | 0 | 0 | 0 | 0 | 0 |
| 15 | 1,068624 | 1,14714 | 1,283004 | 1,475621 | 1,724487 | 0 | 0 | 0 |
| 12,5 | 0,748801 | 0,827434 | 0,96318 | 1,155306 | 1,403207 | 1,706598 | 0 | 0 |
| 10 | 0,487156 | 0,565798 | 0,701157 | 0,892405 | 1,138875 | 1,440352 | 0 | 0 |
| 7,5 | 0,283629 | 0,362012 | 0,496472 | 0,686141 | 0,930483 | 1,229496 | 1,583527 | 0 |
| 5 | 0,138174 | 0,215724 | 0,348404 | 0,535528 | 0,776835 | 1,072602 | 1,423349 | 0 |
| 2,5 | 0,050649 | 0,126498 | 0,256084 | 0,439204 | 0,676165 | 0,967619 | 1,314241 | 0 |
| 0 | 0,020553 | 0,09362 | 0,218612 | 0,396033 | 0,627053 | 0,912895 | 1,254395 | 1,652185 |
| -2,5 | 0,046367 | 0,115871 | 0,235083 | 0,405233 | 0,628653 | 0,907447 | 1,242688 | 0 |
| -5 | 0,124772 | 0,190572 | 0,303827 | 0,465825 | 0,680542 | 0,950999 | 1,278758 | 0 |
| -7,5 | 0,251041 | 0,313836 | 0,421376 | 0,576191 | 0,782252 | 1,043815 | 1,363169 | 0 |
| -10 | 0,420719 | 0,481895 | 0,585365 | 0,734297 | 0,932838 | 1,185937 | 0 | 0 |
| -12,5 | 0,631287 | 0,691979 | 0,793141 | 0,938177 | 1,13112 | 1,377177 | 0 | 0 |
| -15 | 0,881609 | 0,942421 | 1,04282 | 1,185658 | 1,375067 | 0 | 0 | 0 |
| -17,5 | 1,171398 | 1,232834 | 1,333105 | 0 | 0 | 0 | 0 | 0 |
| -20 | 0 | 0 | 0 | 0 | 0 | 0 | 0 | 0 |

Fig. 8a

Pfeilhöhen:

| 0 | -20 | -17,5 | -15 | -12,5 | -10 | -7,5 | -5 | -2,5 | 0 |
|---|---|---|---|---|---|---|---|---|---|
| 20 | 0 | 0 | 0 | 0 | 0 | 0 | 0 | 0 | 1,463192 |
| 17,5 | 0 | 0 | 0 | 0 | 0 | 1,351751 | 1,230516 | 1,154267 | 1,123188 |
| 15 | 0 | 0 | 0 | 1,432649 | 1,222377 | 1,056285 | 0,934816 | 0,858412 | 0,827363 |
| 12,5 | 0 | 0 | 1,435241 | 1,181539 | 0,971452 | 0,80533 | 0,683694 | 0,607109 | 0,576043 |
| 10 | 0 | 0 | 1,227201 | 0,974334 | 0,764837 | 0,599018 | 0,477446 | 0,400755 | 0,369616 |
| 7,5 | 0 | 1,35686 | 1,061961 | 0,810421 | 0,602142 | 0,437275 | 0,316257 | 0,239735 | 0,208596 |
| 5 | 0 | 1,231614 | 0,938551 | 0,688921 | 0,48261 | 0,319572 | 0,200009 | 0,124279 | 0,093338 |
| 2,5 | 0 | 1,145583 | 0,854972 | 0,608102 | 0,404841 | 0,24496 | 0,12822 | 0,054403 | 0,024064 |
| 0 | 1,428494 | 1,096785 | 0,809336 | 0,566173 | 0,367188 | 0,211947 | 0,099648 | 0,029303 | 0,000479 |
| -2,5 | 0 | 1,083532 | 0,800033 | 0,561595 | 0,368122 | 0,218933 | 0,112509 | 0,047001 | 0,020916 |
| -5 | 0 | 1,10447 | 0,825692 | 0,592805 | 0,405729 | 0,263502 | 0,163875 | 0,104027 | 0,081486 |
| -7,5 | 0 | 1,158712 | 0,885421 | 0,658653 | 0,478363 | 0,343326 | 0,25058 | 0,198349 | 0,177314 |
| -10 | 0 | 0 | 0,979146 | 0,758828 | 0,585318 | 0,457079 | 0,37049 | 0,320968 | 0,304702 |
| -12,5 | 0 | 0 | 1,108029 | 0,894145 | 0,726942 | 0,604462 | 0,522565 | 0,476302 | 0,46173 |
| -15 | 0 | 0 | 0 | 1,065304 | 0,90314 | 0,784706 | 0,705826 | 0,661476 | 0,647657 |
| -17,5 | 0 | 0 | 0 | 0 | 0 | 0,996895 | 0,919563 | 0,876091 | 0,862511 |
| -20 | 0 | 0 | 0 | 0 | 0 | 0 | 0 | 0 | 1,106712 |

| 0 | 2,5 | 5 | 7,5 | 10 | 12,5 | 15 | 17,5 | 20 |
|---|---|---|---|---|---|---|---|---|
| 20 | 0 | 0 | 0 | 0 | 0 | 0 | 0 | 0 |
| 17,5 | 1,137299 | 1,196414 | 1,300091 | 0 | 0 | 0 | 0 | 0 |
| 15 | 0,841728 | 0,901269 | 1,005406 | 1,153389 | 1,344503 | 0 | 0 | 0 |
| 12,5 | 0,590642 | 0,650549 | 0,754992 | 0,903076 | 1,09398 | 1,327145 | 0 | 0 |
| 10 | 0,384431 | 0,444568 | 0,549005 | 0,696743 | 0,886902 | 1,118967 | 0 | 0 |
| 7,5 | 0,223489 | 0,283546 | 0,3874 | 0,534022 | 0,722666 | 0,953043 | 1,22513 | 0 |
| 5 | 0,108139 | 0,167477 | 0,269782 | 0,414245 | 0,600403 | 0,828231 | 1,097849 | 0 |
| 2,5 | 0,038523 | 0,098156 | 0,195487 | 0,336256 | 0,518581 | 0,742766 | 1,009047 | 0 |
| 0 | 0,014248 | 0,068934 | 0,163658 | 0,298961 | 0,475882 | 0,69515 | 0,95711 | 1,261866 |
| -2,5 | 0,033792 | 0,084599 | 0,173402 | 0,301649 | 0,471495 | 0,684467 | 0,941018 | 0 |
| -5 | 0,093625 | 0,140525 | 0,222954 | 0,343364 | 0,505026 | 0,710451 | 0,960427 | 0 |
| -7,5 | 0,189843 | 0,233084 | 0,309789 | 0,42283 | 0,57621 | 0,773454 | 1,015905 | 0 |
| -10 | 0,317756 | 0,358953 | 0,431424 | 0,538505 | 0,684523 | 0,873797 | 0 | 0 |
| -12,5 | 0,475298 | 0,515786 | 0,585814 | 0,688904 | 0,829288 | 1,011708 | 0 | 0 |
| -15 | 0,661588 | 0,702177 | 0,771337 | 0,872168 | 1,008931 | 0 | 0 | 0 |
| -17,5 | 0,876573 | 0,917681 | 0,986887 | 0 | 0 | 0 | 0 | 0 |
| -20 | 0 | 0 | 0 | 0 | 0 | 0 | 0 | 0 |

Fig. 9a

Pfeilhöhen:

| 0 | -20 | -17,5 | -15 | -12,5 | -10 | -7,5 | -5 | -2,5 | 0 |
|---|---|---|---|---|---|---|---|---|---|
| 20 | 0 | 0 | 0 | 0 | 0 | 0 | 0 | 0 | 1,659511 |
| 17,5 | 0 | 0 | 0 | 0 | 0 | 1,50138 | 1,379958 | 1,303651 | 1,272636 |
| 15 | 0 | 0 | 0 | 1,542449 | 1,331838 | 1,165525 | 1,043953 | 0,967554 | 0,936603 |
| 12,5 | 0 | 0 | 1,511323 | 1,257288 | 1,046964 | 0,880706 | 0,759034 | 0,682506 | 0,651567 |
| 10 | 0 | 0 | 1,275555 | 1,022451 | 0,812796 | 0,646908 | 0,525351 | 0,448755 | 0,417772 |
| 7,5 | 0 | 1,384017 | 1,068928 | 0,837204 | 0,628823 | 0,463931 | 0,342966 | 0,266564 | 0,235592 |
| 5 | 0 | 1,243534 | 0,950325 | 0,700575 | 0,49419 | 0,331146 | 0,211657 | 0,13607 | 0,105312 |
| 2,5 | 0 | 1,148451 | 0,857733 | 0,610758 | 0,407419 | 0,24752 | 0,130852 | 0,057195 | 0,027055 |
| 0 | 1,428472 | 1,096717 | 0,809173 | 0,565888 | 0,366782 | 0,211471 | 0,099216 | 0,029052 | 0,000481 |
| -2,5 | 0 | 1,088557 | 0,802936 | 0,564317 | 0,370641 | 0,221298 | 0,11488 | 0,049592 | 0,023896 |
| -5 | 0 | 1,116483 | 0,837507 | 0,604327 | 0,416932 | 0,274467 | 0,174837 | 0,115297 | 0,093357 |
| -7,5 | 0 | 1,185454 | 0,911829 | 0,684631 | 0,503912 | 0,368602 | 0,275938 | 0,222187 | 0,203995 |
| -10 | 0 | 0 | 1,025783 | 0,804908 | 0,63094 | 0,502494 | 0,416174 | 0,367378 | 0,352221 |
| -12,5 | 0 | 0 | 1,180632 | 0,966146 | 0,798566 | 0,676059 | 0,594568 | 0,549413 | 0,53619 |
| -15 | 0 | 0 | 0 | 1,169289 | 1,006916 | 0,888686 | 0,810566 | 0,767439 | 0,75515 |
| -17,5 | 0 | 0 | 0 | 0 | 0 | 1,139476 | 1,063066 | 1,021001 | 1,009067 |
| -20 | 0 | 0 | 0 | 0 | 0 | 0 | 0 | 0 | 1,298354 |

| 0 | 2,5 | 5 | 7,5 | 10 | 12,5 | 15 | 17,5 | 20 |
|---|---|---|---|---|---|---|---|---|
| 20 | 0 | 0 | 0 | 0 | 0 | 0 | 0 | 0 |
| 17,5 | 1,266926 | 1,346322 | 1,450361 | 0 | 0 | 0 | 0 | 0 |
| 15 | 0,951153 | 1,010952 | 1,115402 | 1,263729 | 1,455195 | 0 | 0 | 0 |
| 12,5 | 0,666353 | 0,726494 | 0,831205 | 0,979561 | 1,170717 | 1,404099 | 0 | 0 |
| 10 | 0,432768 | 0,49312 | 0,597781 | 0,745722 | 0,93604 | 1,168227 | 0 | 0 |
| 7,5 | 0,250671 | 0,310929 | 0,414968 | 0,561729 | 0,750443 | 0,980815 | 1,252824 | 0 |
| 5 | 0,120303 | 0,17983 | 0,282288 | 0,42683 | 0,612975 | 0,840698 | 1,110129 | 0 |
| 2,5 | 0,041724 | 0,099567 | 0,199042 | 0,33984 | 0,522071 | 0,746055 | 1,012047 | 0 |
| 0 | 0,014532 | 0,069517 | 0,164418 | 0,299733 | 0,476453 | 0,695415 | 0,956982 | 1,261273 |
| -2,5 | 0,037234 | 0,088517 | 0,177598 | 0,305833 | 0,475407 | 0,687952 | 0,94399 | 0 |
| -5 | 0,106518 | 0,153939 | 0,236827 | 0,357304 | 0,518642 | 0,723519 | 0,972842 | 0 |
| -7,5 | 0,217754 | 0,262028 | 0,339427 | 0,452722 | 0,605842 | 0,802481 | 1,044176 | 0 |
| -10 | 0,366784 | 0,409332 | 0,482737 | 0,590319 | 0,736259 | 0,824994 | 0 | 0 |
| -12,5 | 0,551412 | 0,593446 | 0,664619 | 0,768447 | 0,908996 | 1,091047 | 0 | 0 |
| -15 | 0,770786 | 0,813003 | 0,883481 | 0,985229 | 1,122374 | 0 | 0 | 0 |
| -17,5 | 1,024661 | 1,067625 | 1,138261 | 0 | 0 | 0 | 0 | 0 |
| -20 | 0 | 0 | 0 | 0 | 0 | 0 | 0 | 0 |

Fig. 10a

METHOD FOR COMPUTING A PROGRESSIVE SPECTACLE LENS AND METHODS FOR MANUFACTURING A SPECTACLE LENS OF THIS KIND

CROSS REFERENCE TO RELATED APPLICATIONS

The present application is a continuation of International Patent Application No. PCT/DE01/01579, filed Apr. 25, 2001, designating the United States of America, the entire disclosure of which is incorporated herein by reference. Priority is claimed based on German Patent Application Nos. 100 20 244.6, filed Apr. 25, 2000; 100 21 047.3, filed Apr. 28, 2000; and International Patent Application NO. PCT/DE01/00188, filed Jan. 17, 2001.

FIELD OF THE INVENTION

This invention relates to a method for computing a progressive spectacle lens, and also to a method for manufacturing a spectacle lens of this kind, drop plate kind molds, casting molds for casting, or molding plugs for press-forming spectacle lenses of this kind from a plastics material.

Progressive spectacle lenses (also called varifocal lenses, multifocal lenses etc.) are usually understood to be spectacle lenses having a different (smaller) power in the region through which a spectacles wearer views an object located at a great distance—hereunder designated as a distance portion—than in the region (near portion) through which the spectacles wearer views a near object. Located between the distance portion and the near portion is the so-called progressive zone in which the power of the spectacle lens continuously increases from that of the distance portion to that of the near portion. The magnitude of the power increase is also designated as addition power.

As a rule, the distance portion is located in the upper part of the spectacle lens and designed for viewing "to infinity", whilst the near portion is located in the lower region and is particularly designed for reading. In spectacles for special applications—those for pilots or for monitor work stations are mentioned as examples—the distance and near portions may also be arranged differently and/or designed for other distances. Furthermore, it is possible for a plurality of near portions and/or distance portions and suitable progressive zones to be present.

With progressive spectacle lenses having a constant refractive index it is necessary, for the power to increase between the distance portion and the near portion, that the curvature of one or both surfaces continuously change from the distance portion to the near portion.

The surfaces of spectacle lenses are usually characterized by the so-called principal radii of curvature R1 and R2 at every point on the surface. (Sometimes also the principal curvatures K1=1/R1 and K2=1/R2 are given instead of the principal radii of curvature.) Together with the refractive index of the glass material, the principal radii of curvature govern the parameters frequently used for an ophthalmologic characterization of a surface:

Surface power=$0.5 \cdot (n-1) \cdot (1/R1+1/R2)$

Surface astigmatism=$(n-1) \cdot (1/R1-1/R2)$.

Surface power is the parameter via which an increase of power from the distance portion to the near portion is achieved. Surface astigmatism (more clearly termed cylinder power) is a "troublesome property", because an astigmatism—inasmuch as an eye does not have an innate astigmatism to be corrected—which exceeds a value of about 0.5 dpt results in an indistinctly seen image on the retina.

BACKGROUND OF THE INVENTION

Although any change of the curvature of the surface which is needed to achieve a surface power increase without vision being "disturbed" by surface astigmatism can be attained relatively simply along a (plane or curved) line, considerable "intersections" of surfaces will result alongside this line, leading to a large surface astigmatism which more or less impairs the lens in regions alongside the mentioned line. According to Minkwitz' Law, for a line lying in a plane and designed as a umbilical line, the surface astigmatism in the direction perpendicular to the umbilical line increases with a gradient which is twice that of the surface power along the umbilical line, so that, particularly in the progressive zone, disturbing values of the surface astigmatism already result close to the umbilical line. (A line which at every point has the same principal curvatures, i.e. is free of surface astigmatism, is termed a navel line or umbilical lime or ombilical line).

For this reason, the designing of a progressive spectacle lens surface contributing to power change has in the past started out from a line lying in a plane or extending in a sinuous manner—also termed a principal meridian or a principal line—which runs centrally along the surface from top to bottom, and approximately follows the principal viewing line. A principal viewing line is understood to be a series of points of penetration of the rays of sight directed through the spectacle lens surface onto objects located at different distances centrally in front of the nose during a movement, in particular a lowering, of the glance. The principal curvatures of each point of this line were chosen in such manner that the desired increase of the surface power from the distance portion to the near portion is achieved. Setting out from this line, (more or less) suitable computations were then made of the lateral regions of the surface using various methods or approaches.

In case of a planar principal line (i.e. principal meridian), the spectacle lens, when being fitted into a spectacle frame, is usually tilted by about 8° to 10°, so that the principal meridian extends obliquely from top to bottom in correspondence with the convergence of the eyes. Progressive spectacle lenses having a planar principal meridian are described, for example in U.S. Pat. No. 2,878,721 or DE-AS 20 44 639.

Attention is expressly drawn to these publications—as well as to all publications mentioned in the following—concerning all remaining terms not described here in greater detail.

Because the principal viewing line on a spectacle lens surface is not a straight or planar line, the use of a planar principal meridian always represents a compromise. For this reason it has been suggested for a long time that a sinuous line—also designated as a principal line—be used as a "construction backbone" for a progressive surface, the course of which follows, as well as possible, the actual course of the principal viewing line as determined by physiology, and not by the structure (!) of the spectacle lens.

Progressive spectacle lenses having a sinuous principal line have been described in many patent publications.

Attention drawn to U.S. Pat. No. 4,606,622 only as an example. In this publication, however, no details can be found of how the course of the principal line can be made "to coincide" with the principal viewing line.

Although various other publications are concerned with the course of the principal line, the approaches made therein are unsatisfactory—as will be set out in the following:

For the surfaces described in DE-C-42 38 067 and DE-C-43 42 234 the course of the principal line is composed of straight sections; in this, the angles between the straight lines vary in dependence on the addition power. To compose the principal line from straight sections is an unsuitable approach, because the principal line must be twice differentiable. To vary the principal line in dependence only on the addition power, in order to bring it into coincidence with the principal viewing line, is also unsatisfactory, because the principal viewing line depends on many other parameters. Furthermore, in these publications no method is given of how a progressive surface may be designed around this principal line to have properties as specified along the principal line.

The European Patent Application 88 307 917 describes that the course of the principal line should be varied in dependence on—and only on—the addition power. Apart from this, the course of the principal line is stipulated, presumably in the expectation that it will coincide with the principal viewing line.

In DE-A-196 12 284, in which the distinction made in the present application between principal line (construction line of at least one surface of the spectacle lens) and principal viewing line (physiological property) is not made, and which instead mentions only a principal viewing line (which, after all, is a property of the spectacle lens), a spectacle lens is described having a principal line—or more precisely stated, an offset principal line—which varies in dependence on the power of the distance portion (stronger principal meridian) and the addition power. Whether a principal line of this kind coincides with the actual principal viewing line is not investigated more closely. Furthermore, no method is given for determining the principal viewing line. Similarly, it is not taken into consideration that the principal viewing line depends on many other parameters, and that if the principal line is varied only in dependence on the addition power and the distance portion power, then it cannot coincide with the actual principal viewing line.

In the patent application PCT/DE95/00438 a principal line is described, the course of which has the form $$x_0(y) = b + a - \frac{a}{1 + e^{c(y+d)}}$$

How this principal line may be conformed to the principal viewing line is not described in detail.

In accordance with the invention it has been realized that in many cases, for example with an astigmatic prescription including an oblique cylinder axis, this form is not satisfactory for bringing the principal line into coincidence with the principal viewing line.

In DE-A-43 37 369 a method is described for computing a strip of second order. A method for computing a strip of second order which coincides with the principal viewing line is not given.

DESCRIPTION OF THE INVENTION

The invention is based on the object of providing a method for computing a progressive spectacle lens in which certain properties of power and astigmatism are present along a line—referred to as a principal line in the following—and in which this line coincides with the principal viewing line. Moreover, a suitable method of manufacture is to be described.

An achievement of this object in accordance with the invention is described in patent claim 1. Further developments of the invention are the subject matter of claims 2 to 18. In claims 19 and 20 methods for manufacturing appropriate surfaces or spectacle lenses are given.

The invention is based on the fundamental concept of departing from the hitherto usual practice of stipulating a principal line—possibly in dependence on certain parameters—as an unchangeable construction-backbone of the progressive surface for optimizing the surface, and instead of this, proceeding in an opposite manner, i.e. by first determining the principal viewing line on a surface computed by means of a first approximation, and then conforming the course of the principal line, and with it the surface, to the actual course of the principal viewing line. Only by proceeding in this manner in accordance with the invention is it possible to bring these two lines into coincidence.

The method according to the invention is rendered distinct, in particular, by the following steps:

a. stipulating as initial parameters a course of a projection $x_0(y)$ of the principal line on the x,y plane, and also properties of the spectacle lens along the principal line whilst taking into account spherical, cylindrical, and possibly also prismatic prescription values and the addition power, as well as an interpupillary distance, and computing from these stipulations at least one strip of second order on a progressive surface of the spectacle lens;

b. stipulating an object-distance function $Al(y)$ which describes a change of object distance with a movement, in particular a lowering, of a glance;

c. determining on each horizontal meridian of the progressive spectacle lens a point of penetration of a principal ray through the progressive surface, for which point a distance of a point of intersection of this principal ray with a plane which bisects the interpupillary distance is equal to the object distance given by the object-distance function $Al(y)$;

d. computing for the entirety of these points of penetration lying on the principal viewing line a course of the projection $x'_0(y)$ on the x,y plane;

e. equating the course $x_0(y)$ to $x'_0(y)$ and checking the coincidence;

f. subsequently iteratively repeating the steps a. to e. until the projection $x_0(y)$ of the principal line is equal (within given limits) to the course of the principal viewing line projection $x'_0(y)$ used for the computation of the respective surface.

The principal line as a sinuous line is unequivocally defined by two projections, for example the projection $x_0(y)$ on the x,y plane and the projection $z_0(y)$ on the y,z plane.

For computing a spectacle lens or the respective progressive surface based on a principal line coinciding at least within given limits with the principal viewing line, a course of the projection $x_0(y)$ of the principal line, based for example on values of experience, is first stipulated, and then, using this projection and the other stipulations of properties along the principal line, a spectacle lens is designed in the form of at least a strip of second order.

Next, the points of penetration of the principal rays through the progressive spectacle lens, i.e. the rays passing through the center of rotation of the eye, are computed. On each horizontal meridian the point of penetration through the progressive surface is selected, at which the distance from the point of penetration through the front surface to the point of intersection of the principal ray with the central plane, that is the vertical plane which bisects the interpupillary distance, corresponds to the stipulated object distance Al(y). The object distance function Al(y) may be determined, for example empirically or by measurement, for a particular spectacles wearer.

The thus determined points of penetration through the progressive surface form the principal viewing line. Now the projection $x_0(y)$ of the principal line is equated to the principal viewing line, i.e. the spectacle lens is designed a second time, and the principal viewing line is computed once again. This is repeated until the principal line and the principal viewing line coincide. As a rule, one iteration step will already be sufficient.

The properties stipulated for the computation of the spectacle lens may be, for example, surface properties and in particular the surface astigmatism $A_0(y)$ and the mean surface power $D_0(y)$ on the principal line, wherein the vertex height z and the derivatives $\delta z/\delta x$ and $\delta z/\delta y$ at one point on the principal line are stipulated as initial conditions.

A progressive spectacle lens of this kind can be described with a sinuous principal line and any horizontal meridian, e.g. with a power series.

Each horizontal meridian may then be described by $$z(x, y_c) = x_0(y_c) + z_0(y_c) + \sum_{i=1}^{n} a_i \cdot (x - x_0(y_c))^i$$

or the entire surface may be described by $$z(x, y) = x_0(y) + z_0(y) + \sum_{i=1}^{n} a_i(y) \cdot (x - x_0(y))^i.$$

By stipulating the projection of the principal line and a particular surface astigmatism and a particular mean surface power on the principal line, as well as the initial conditions—vertex height z and the two derivatives $$\frac{\partial z}{\partial x} \text{ and } \frac{\partial z}{\partial y}$$

at a particular position, a so-called strip of second order is unequivocally determined. This precisely leads to
 a projection $z_0(y)$ and
 a respective course of the coefficients $a_1(y)$ and $a_2(y)$.

These parameters may be computed either by solving the system of differential equations or with the aid of a target function. The higher order coefficients $a_3(y)$ to $A_n(y)$ (hence the term "strip of second order") may be chosen freely and may be used for optimizing the periphery of the spectacle lens.

Of course, any other surface representation which can be differentiated (at least) twice is possible.

In this, the stipulated surface astigmatism $A_0(y)$ is determined by its magnitude and its cylinder axis. The deviation from the stipulated astigmatism $A_0(y)$ is computed, for example, by means of the cross-cylinder method which takes account of the magnitude and also the cylinder axis.

Cross-cylinder method:

$$cyl_x = cyl_{act} \cdot \cos(2 \cdot A_{act}) - cyl_{des} \cos(2 \cdot A_{des})$$

$$cyl_y = cyl_{act} \cdot \sin(2 \cdot A_{act}) - cyl_{des} \cdot \sin(2 \cdot A_{des})$$

$$cyl_{res} = \sqrt{cyl_x^2 + cyl_y^2}$$

$$A_{res} = a \tan\left(\frac{cyl_y}{cyl_x}\right)$$

wherein:
$cyl_{act}, A_{act}$ actual cylinder (spectacle lens): magnitude and cylinder axis
$cyl_{des}, A_{des}$ desired cylinder (prescription): magnitude and cylinder axis
$cyl_{res}, A_{res}$ resulting cylinder (astigmatic error): magnitude and cylinder axis If, for example, the prescription reads:
Cylinder: 2.5 dpt, axis: 0 degrees according to TABO, and the computed spectacle lens has at one point on the principal line a cylinder power of 2.5 dpt and a cylinder axis of 2 degrees, then the astigmatic error obtained is 0.174 dpt.

However, in accordance with the invention it is preferred that the properties of the spectacle lens in a wearing position be stipulated, and not the surface properties. In particular, these properties may be the astigmatism and the power of the combination "spectacle lens/eye".

For computing a progressive surface in the wearing position, a wearing situation is stipulated. This relates either to a definite user for whom the individual parameters in the respective wearing position are especially determined and the progressive surface is separately computed, or to average values, as described for example in DIN 58 208, Part 2.

As an initial condition the thickness of the spectacle lens is stipulated instead of the vertex height z, and the prismatic power at a definite position is stipulated instead of the two differentials. Additionally needed are a surface description of the second surface which in particular may be a spherical or an aspherical surface, and the refractive index of the spectacle lens, the interpupillary distance and the distance of the center of rotation of the eye, the pantoscopic angle and the lateral inclination of the spectacle lens, and the object-distance function Al(y).

The values may be standardized or average values of a wearing position, or even better, individually determined data of the prospective spectacles wearer. In this, the actual spectacle frame and its arrangement in front of the eye of the future spectacles wearer may be taken into account in determining the data.

It is the aim of the first part of the computation for the projection $x_0(y)$ of the principal line on the x,y plane to coincide with the projection of the principal viewing line on the x,y plane. Only thereby can it be achieved that the spectacles wearer may have the predetermined (and thus optimum) properties along the principal viewing line, where the main problems of viewing arise.

Because the principal viewing line also depends on the prismatic power in each horizontal meridian, the coincidence may be achieved only by iteration—as has already been stated.

After the iteration problem has been solved, a spectacle lens is obtained for which the imaging properties along the principal viewing line correspond exactly to the stipulated values. For this, all of the individual parameters such as interpupillary distance, distance of center of rotation of the eye, spherical, cylindrical and prismatic prescription values, addition power, object distance, pantoscopic angle and lateral inclination of the spectacles, thickness, refractive index and base curve of the spectacle lens are taken into account during the determination of the principal viewing line.

The functions which describe the course of the projection and the given properties, such as the surface astigmatism or (residual) astigmatism of the system eye/spectacle lens, and also the surface power or the power, must be continuously differentiable (at least) twice and flexible enough to reproduce the stipulated properties.

Suitable functions for the projection $x_0(y)$ of the principal line and also the stipulated properties are, for example, cubic or higher-order spline functions or a function $f(y)$ of the form $$f(y) = b + a - \frac{a}{(1 + e^{c(y+d)})^m} + \sum_i g_i y^i.$$

Furthermore, it is not only possible, starting out from the strip of second order for which the principal line coincides (at least within given limits) with the principal viewing line, and on which the stipulated properties are attained, to compute the individual horizontal meridians ($y=y_c$) by means of the following function $$z(x, y_c) = x_0(y_c) + z_0(y_c) + \sum_{i=1}^{n} a_i \cdot (x - x_0(y_c))^i$$

but also—once again starting out from the strip of second order on which the principal line coincides (at least within given limits) with the principal viewing line—to compute the entire surface by means of cubic or higher order spline functions and usual optimizing methods.

The method of the invention may be employed for any desired surfaces, such as those of spectacle lenses in which the progressive surface is the front surface and which are fabricated as blanks having certain gradations (base curve system).

However, it is particularly preferred to employ the method of the invention with spectacle lenses for which the progressive surface is the eye-side surface and is computed individually for a particular spectacles wearer. For this, the front surface may be a spherical or aspherical surface and, in particular, a toroidal or atoroidal surface, wherein the cylinder power imparted by the toroidal or atoroidal surface does not necessarily have to serve to compensate an astigmatism of the respective eye. The toroidicity may also be chosen for reasons of appearance, as was described in an earlier application.

For this, the progressive surface computed in accordance with the invention may also serve in a manner known per se in the manufacture of a progressive spectacle lens by means of any surface-shaping or surface-working method.

For example, the surface data may be employed directly to control a grinding machine and possibly also to control a polishing operation of a spectacle lens blank of any desired silicate glass or a plastics material (having any refractive index). Suitable numerically controlled grinding and polishing machines are generally known.

Of course, the surface data may also be used for manufacturing casting molds for the casting, and drop plate type molds or molding plugs for the press-forming of spectacle lenses from a plastics material.

For this it is possible to add "correction data" to the determined surface data, which take into account errors during the manufacturing operation in a known manner. Errors of the prefabricated second surface, which have been determined in particular by measurement technology, may also be taken into account in the computation of the progressive surface.

The data may be used in the same way for the second surface and the arrangement of the two surfaces relative to each other in the manufacture of the spectacle lens by working the second surface, or in arranging the second casting mold relative to the casting mold for the progressive surface.

BRIEF DESCRIPTION OF THE DRAWINGS

In the following the invention will be described by way of example, without limitation of the general inventive concept, with the aid of embodiments with reference to the drawings to which attention is expressly drawn concerning the disclosure of all details of the invention not described more explicitly in the text.

FIGS. 1a–6a show the iso-lines of the astigmatic deviation;

FIGS. 1b–6b show the iso-lines of the mean "as worn" power;

FIGS. 1c–6c show the iso-lines of the surface astigmatism;

FIGS. 1d–6d show the iso-lines of the mean surface power for spectacle lenses of the invention;

FIGS. 7a–10a show the vertex heights of further examples of embodiment;

FIGS. 7b–10b show the iso-lines of the astigmatic deviation;

FIGS. 7c–10c show the iso-lines of the mean "as worn" power;

FIGS. 7d–10d show the iso-lines of the surface astigmatism;

FIGS. 7e–10e show the iso-lines of the mean surface power for spectacle lenses of the present invention.

DESCRIPTION OF EXAMPLES OF EMBODIMENT

For all examples of embodiment the progressive surface is the eye-side surface, without any limitation of generality. The front surface is a spherical or a toroidal surface.

In all Figures the abscissa (x-axis) is the horizontal axis and the ordinate (y-axis) is the vertical axis in the wearing position.

The example of embodiment illustrated in FIG. 1 has a mean "as worn" power of 5 dpt in the distance portion; the addition power is 1 dpt.

Figure 1A:
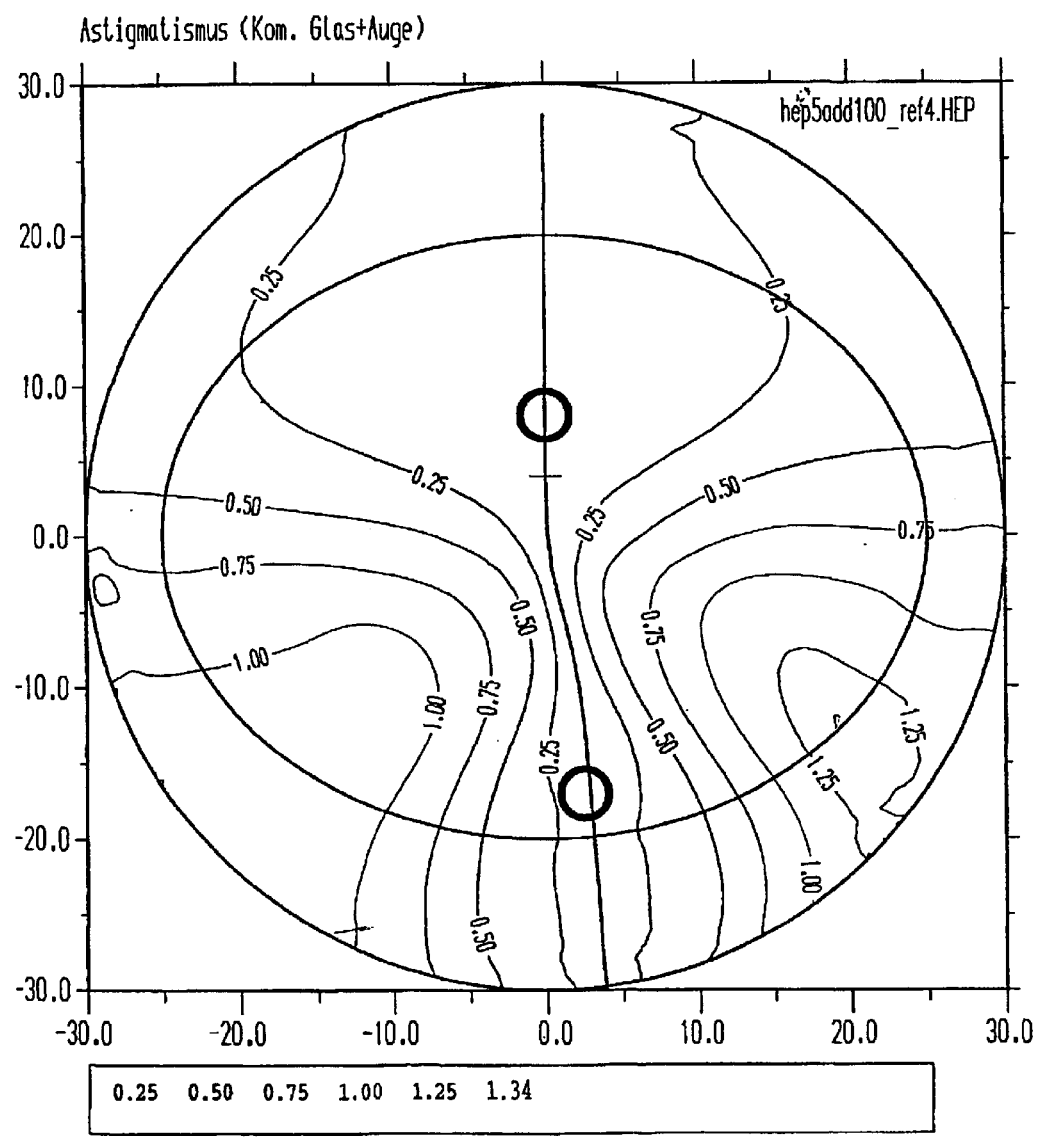
Figure 1B:
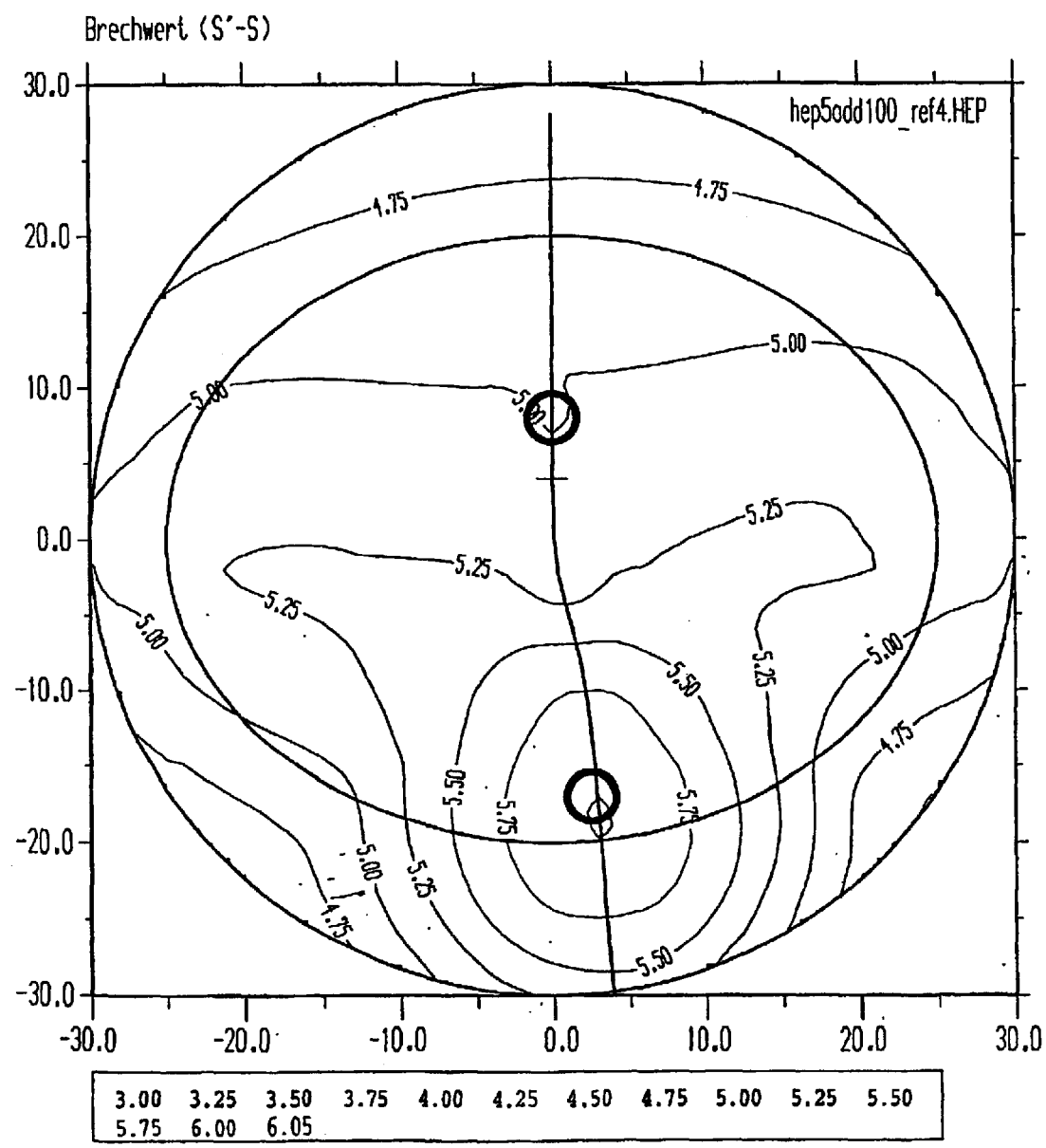
Figure 1C:
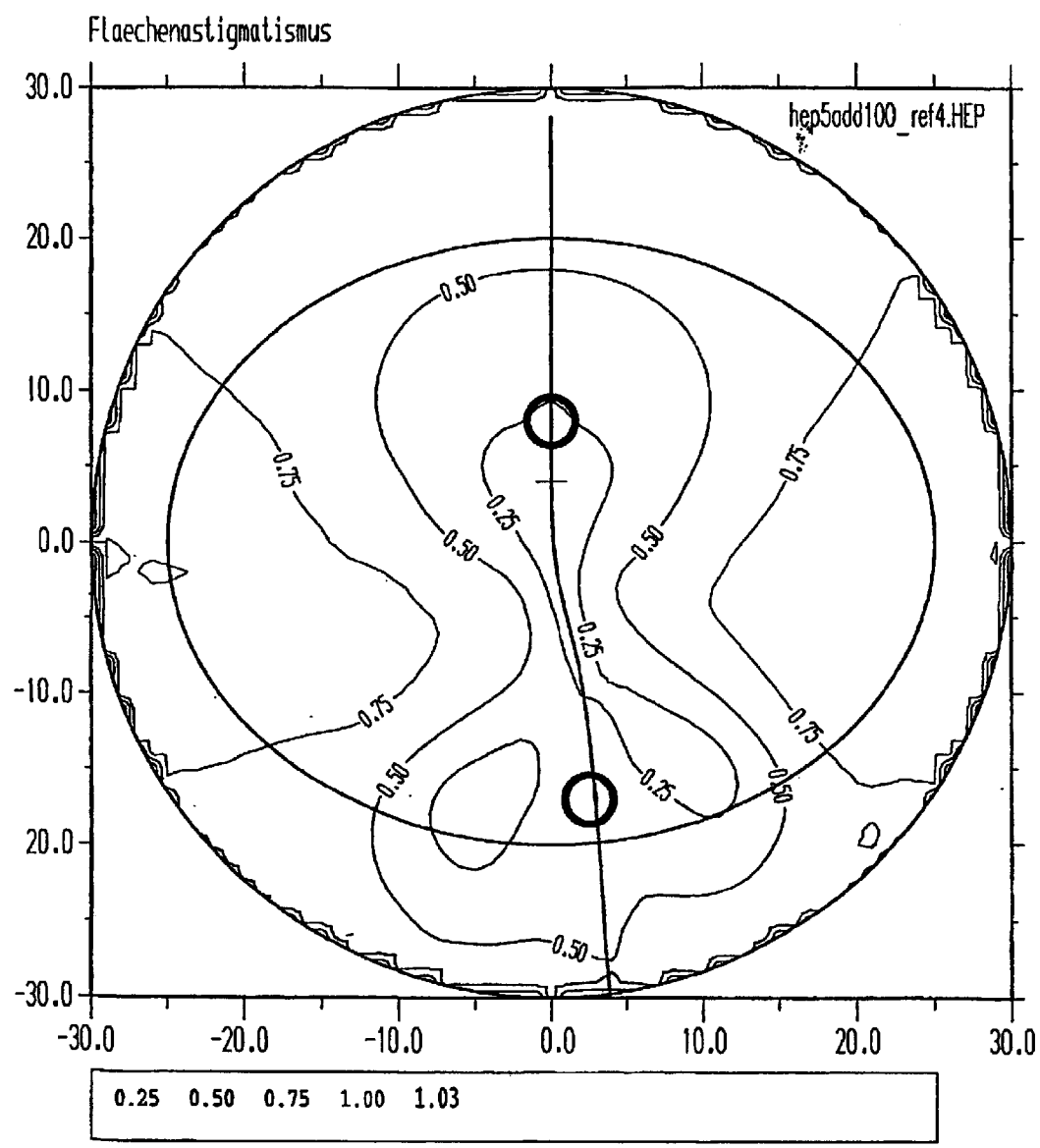
Figure 1D:
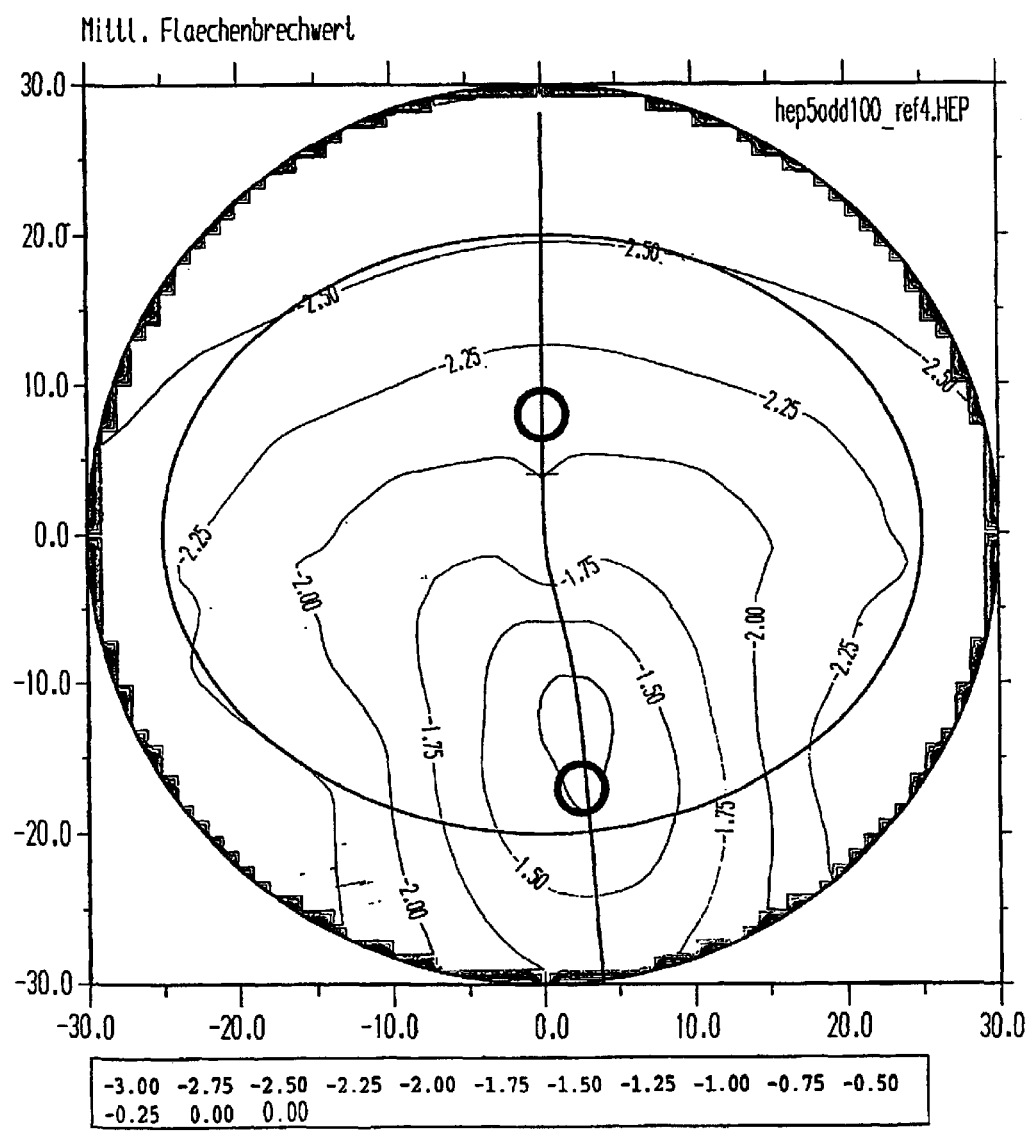
Figure 2A:
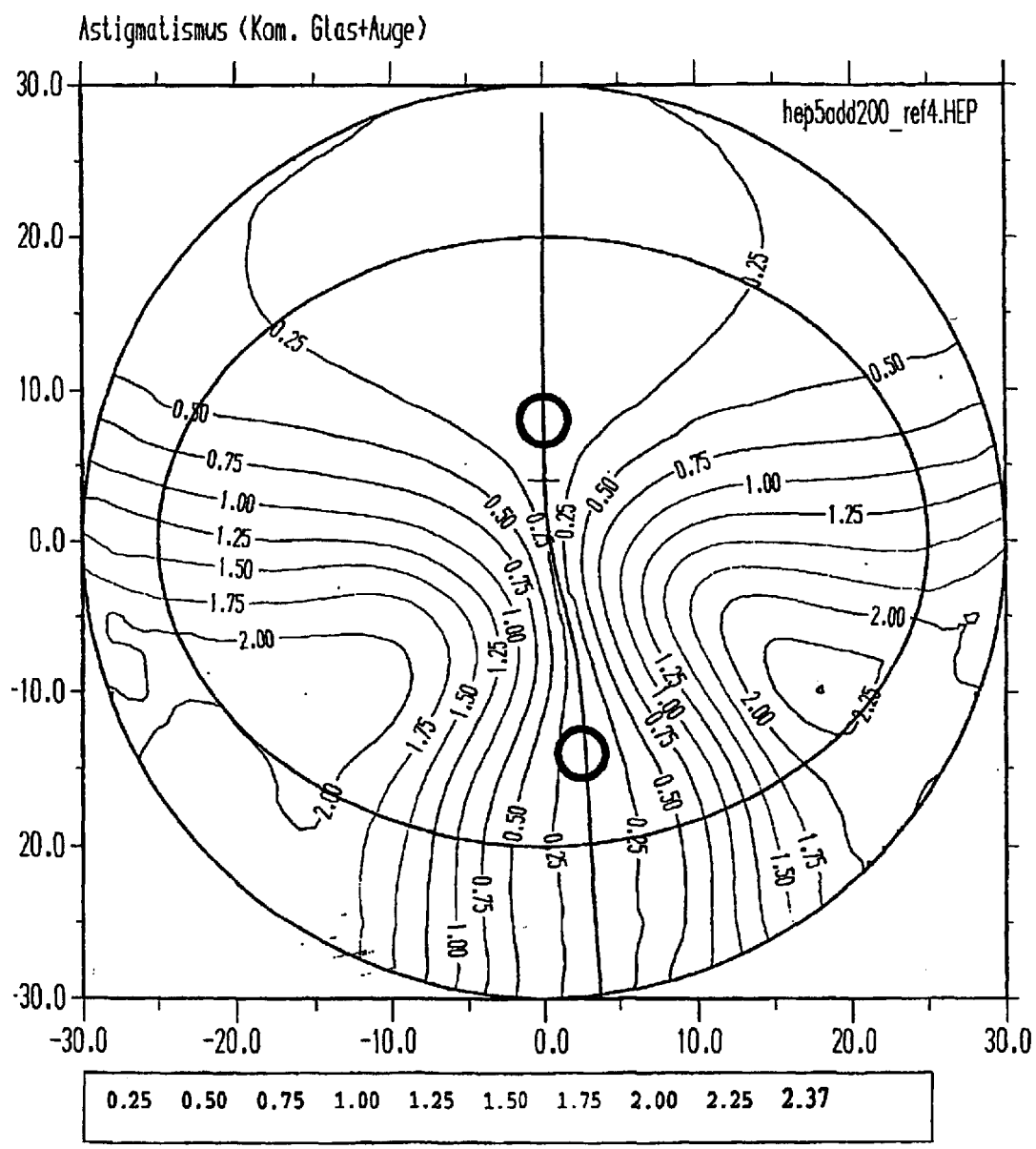
Figure 26:
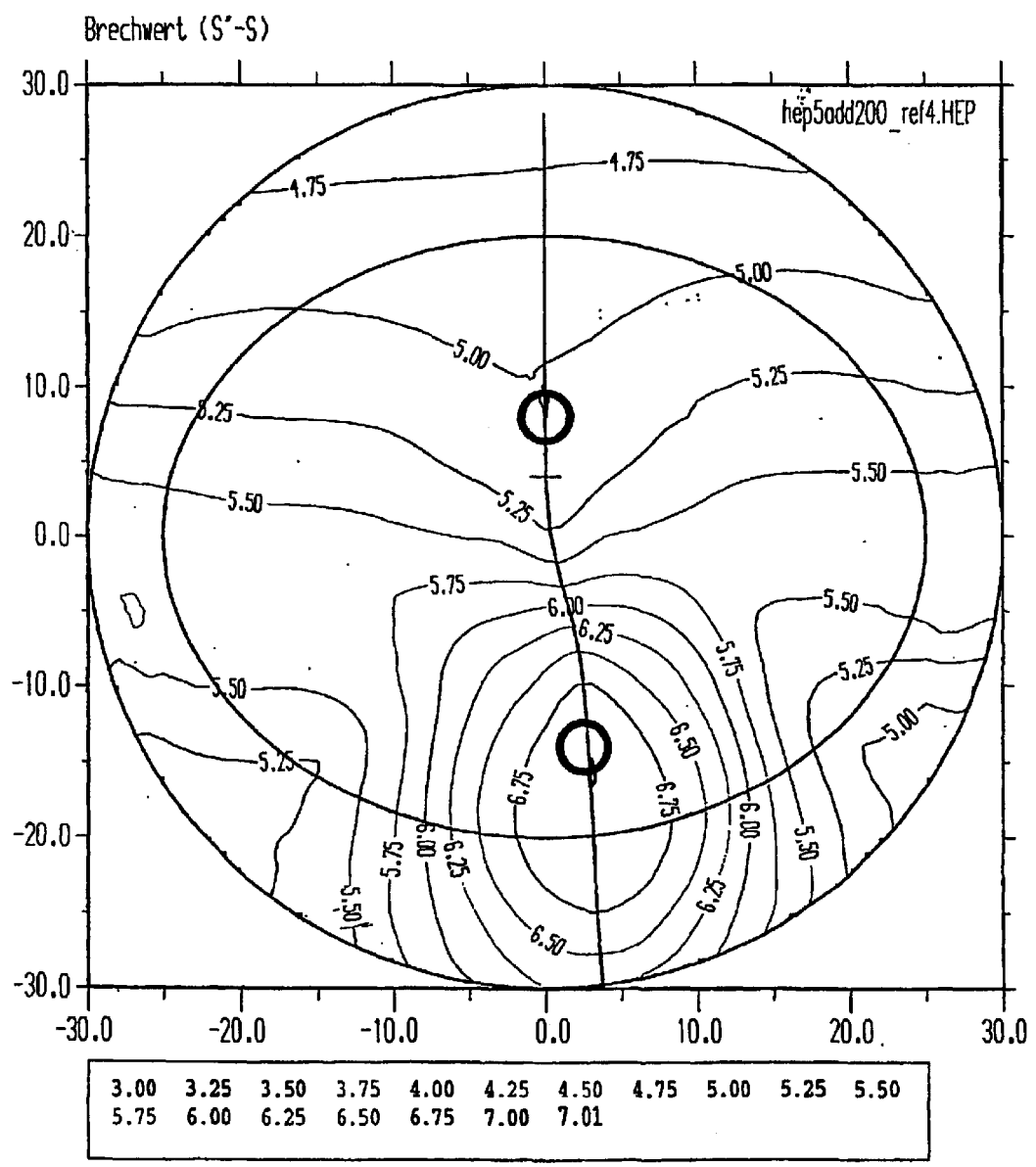
Figure 2C:
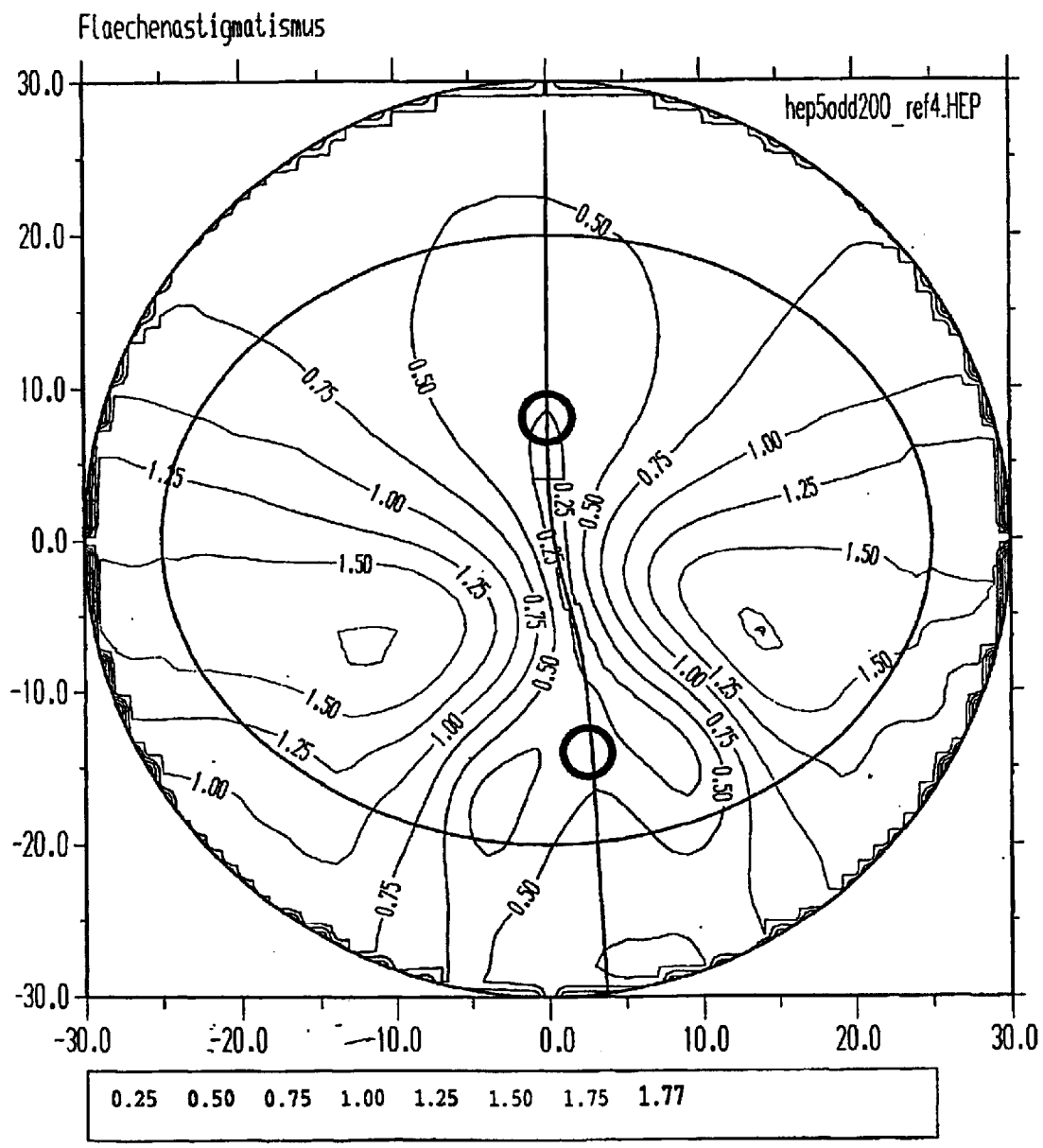
Figure 2D:
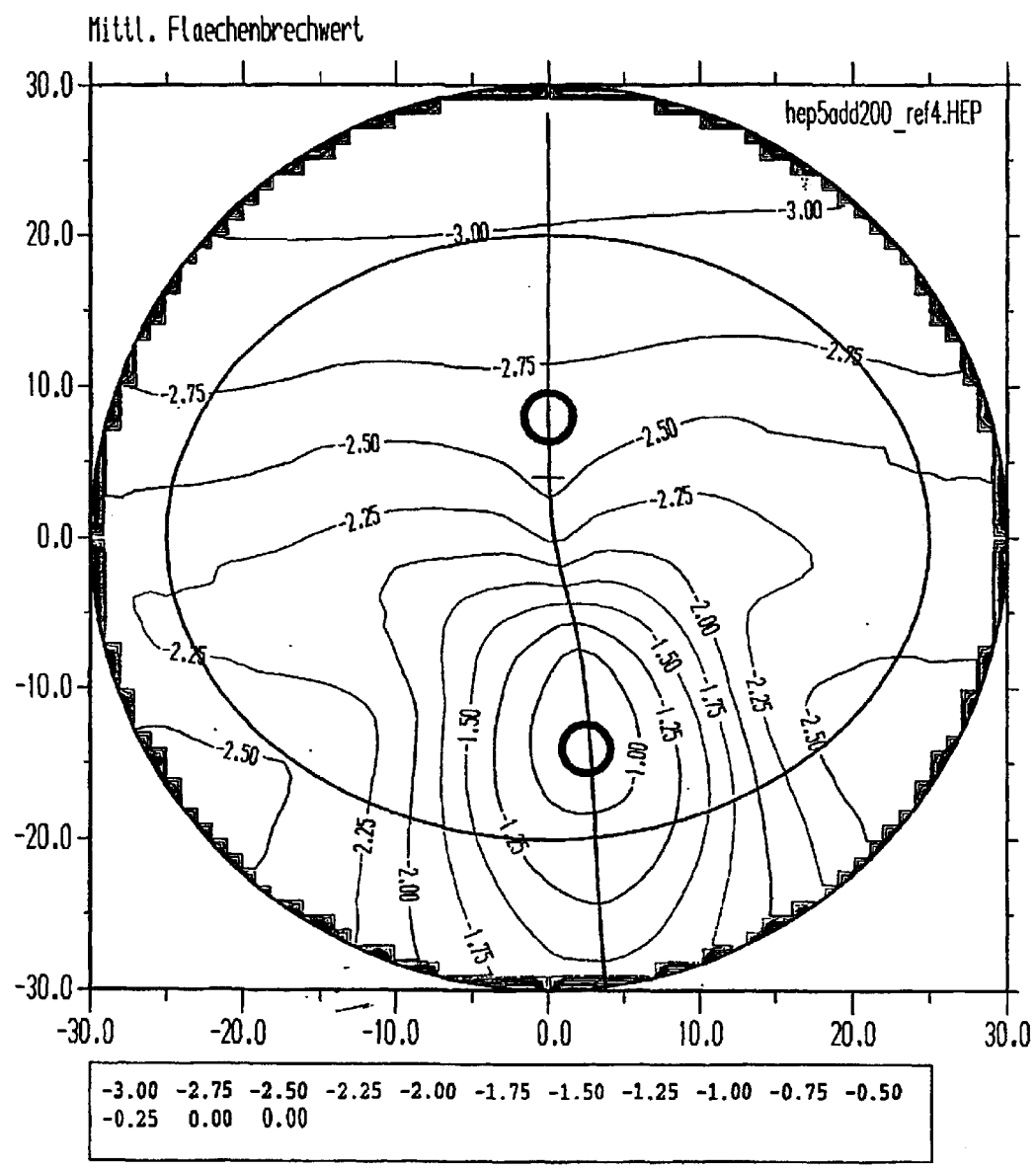
Figure 3A:
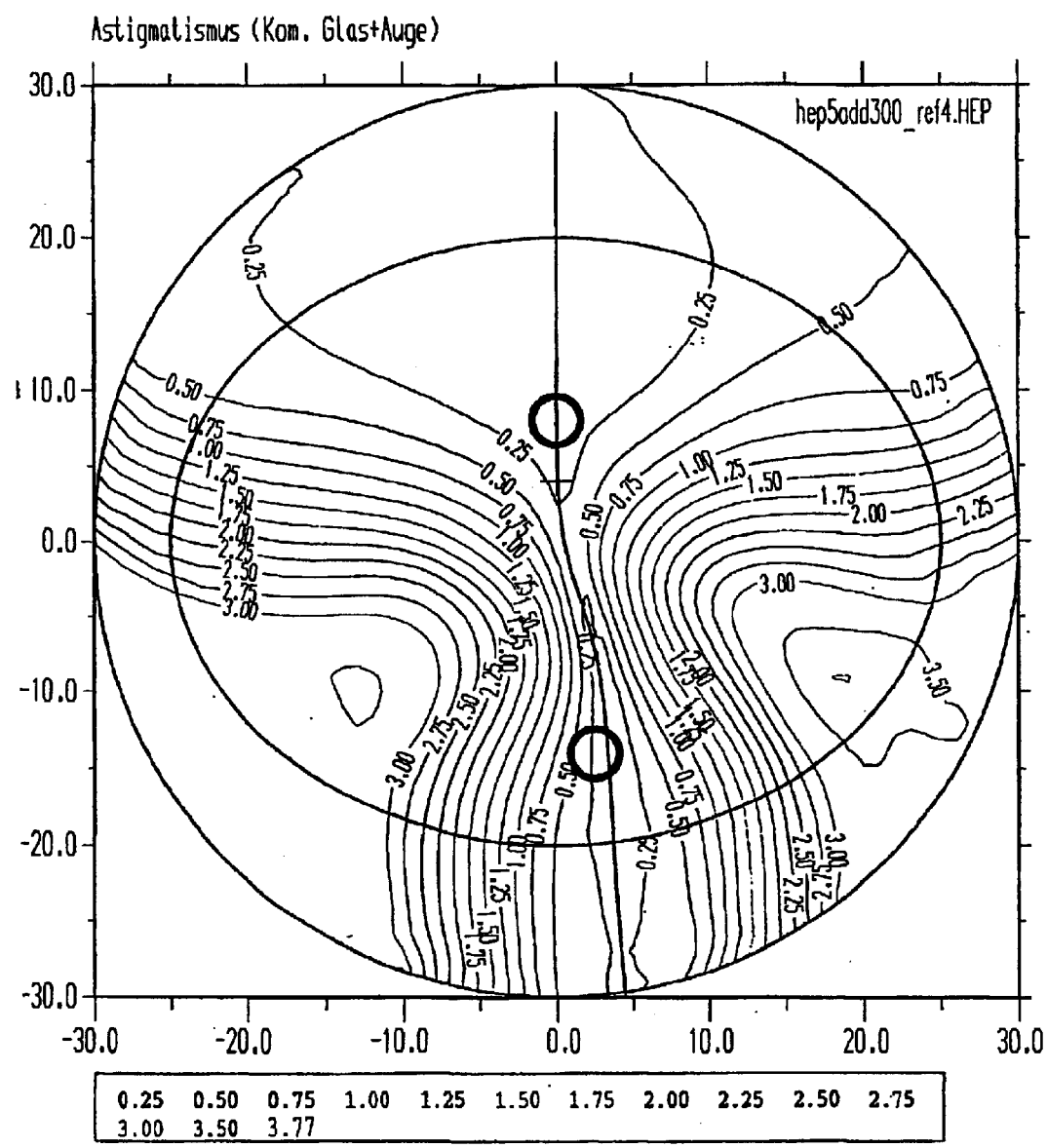
Figure 3B:
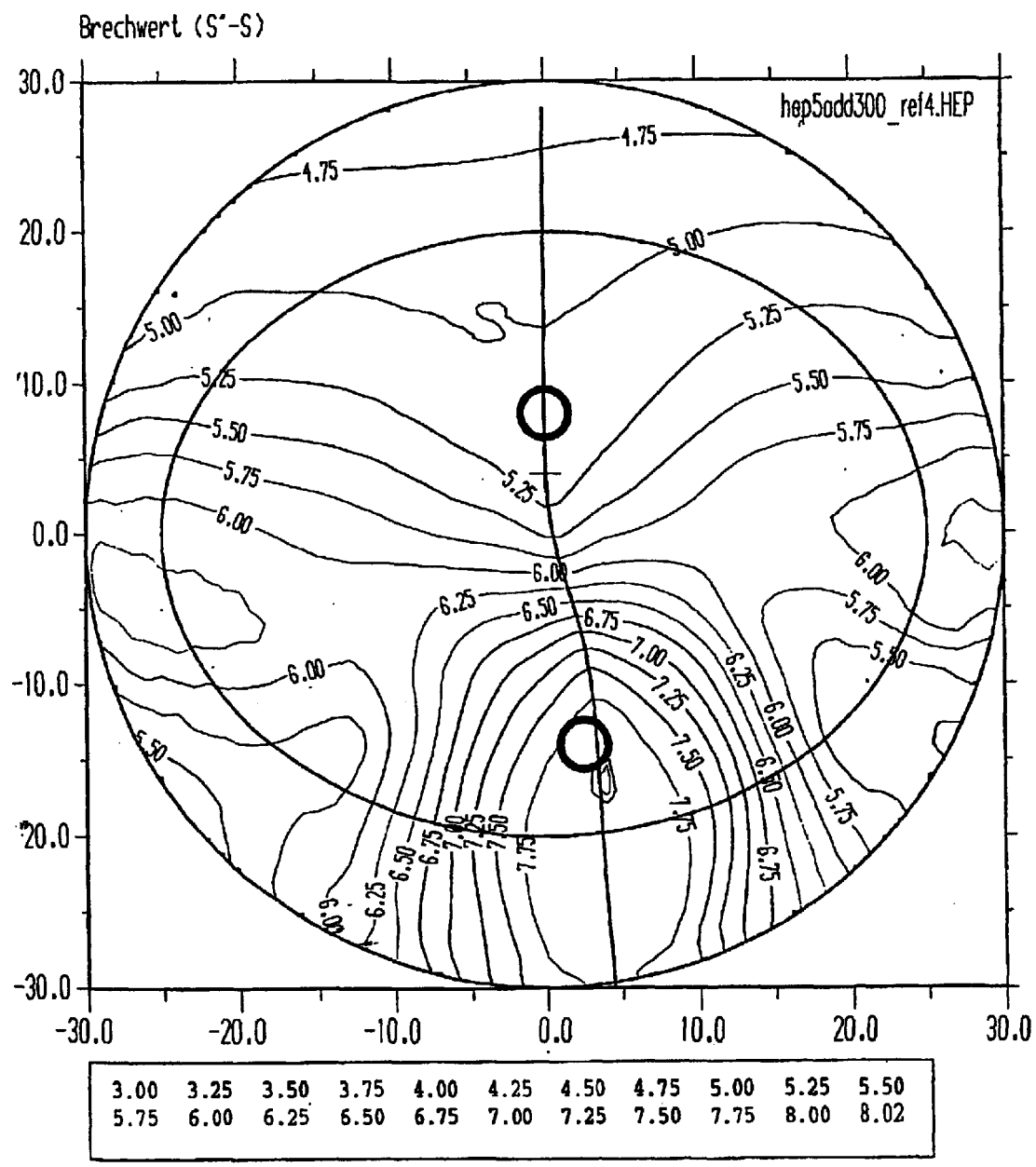
Figure 3C:
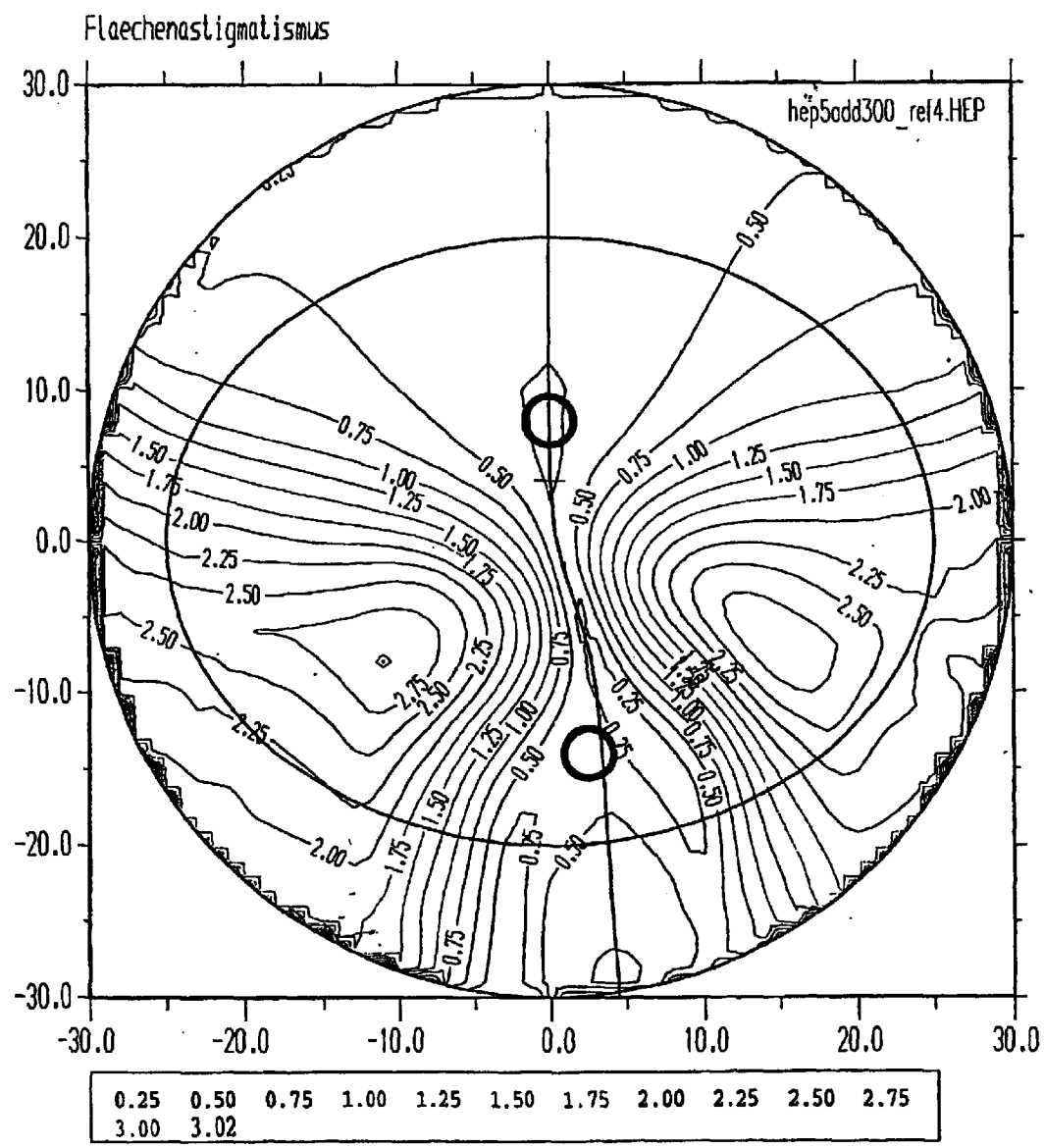
Figure 3D:
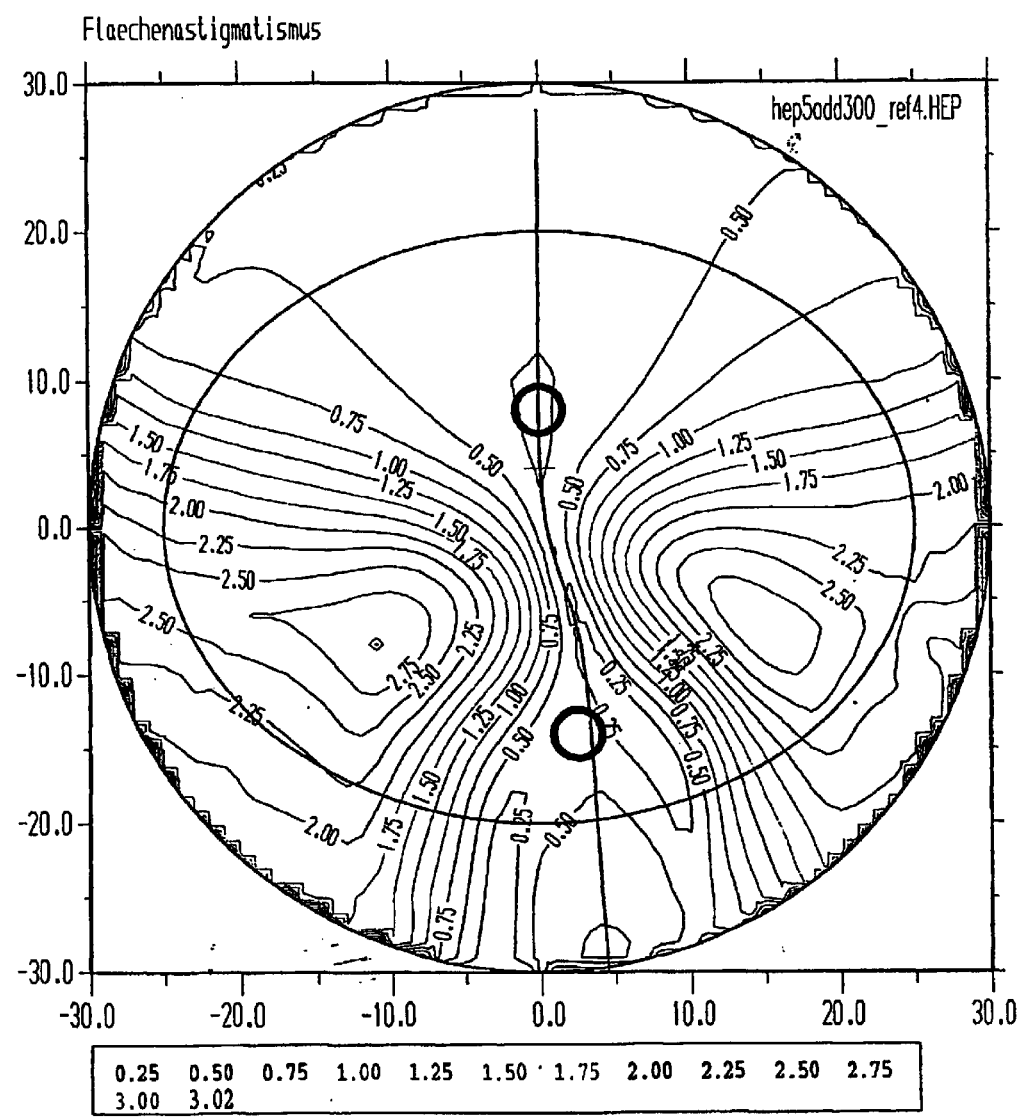

The examples of embodiment illustrated in FIGS. 2 and 3 have the same mean "as worn" power in the distance portion; however, their addition powers are 2 and 3 dpt, respectively.

Figure 4A:
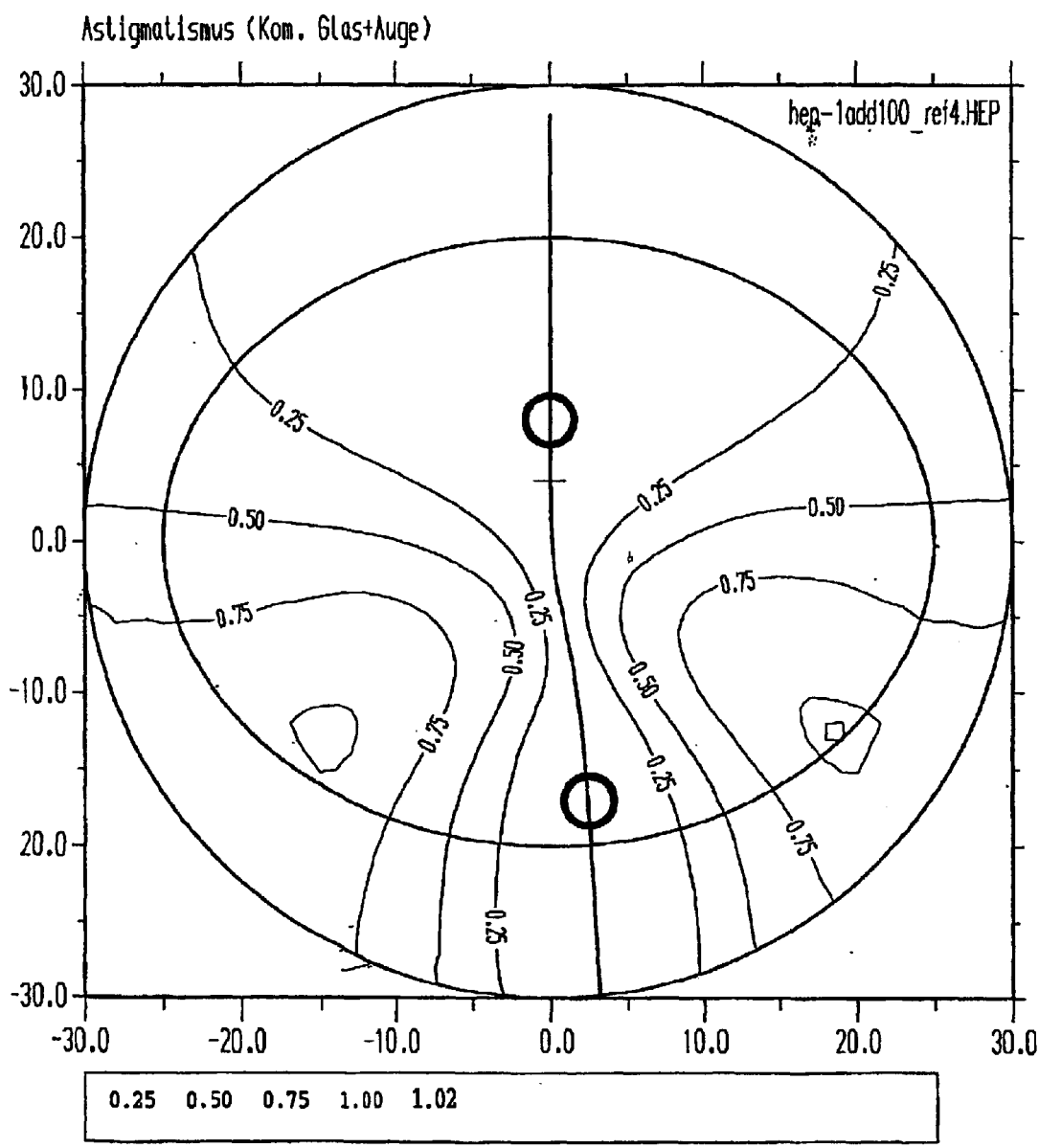
Figure 46:
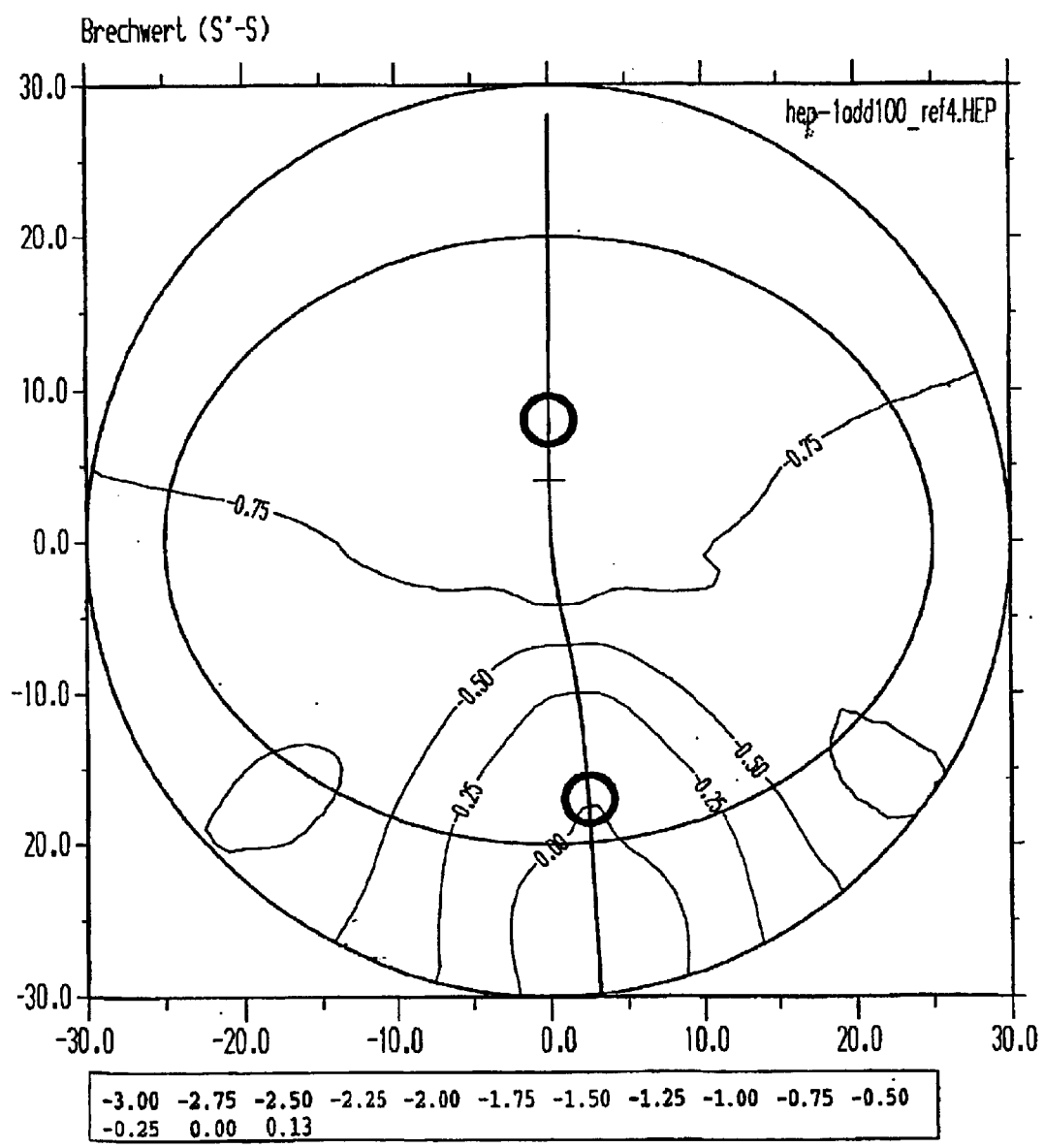
Figure 4C:
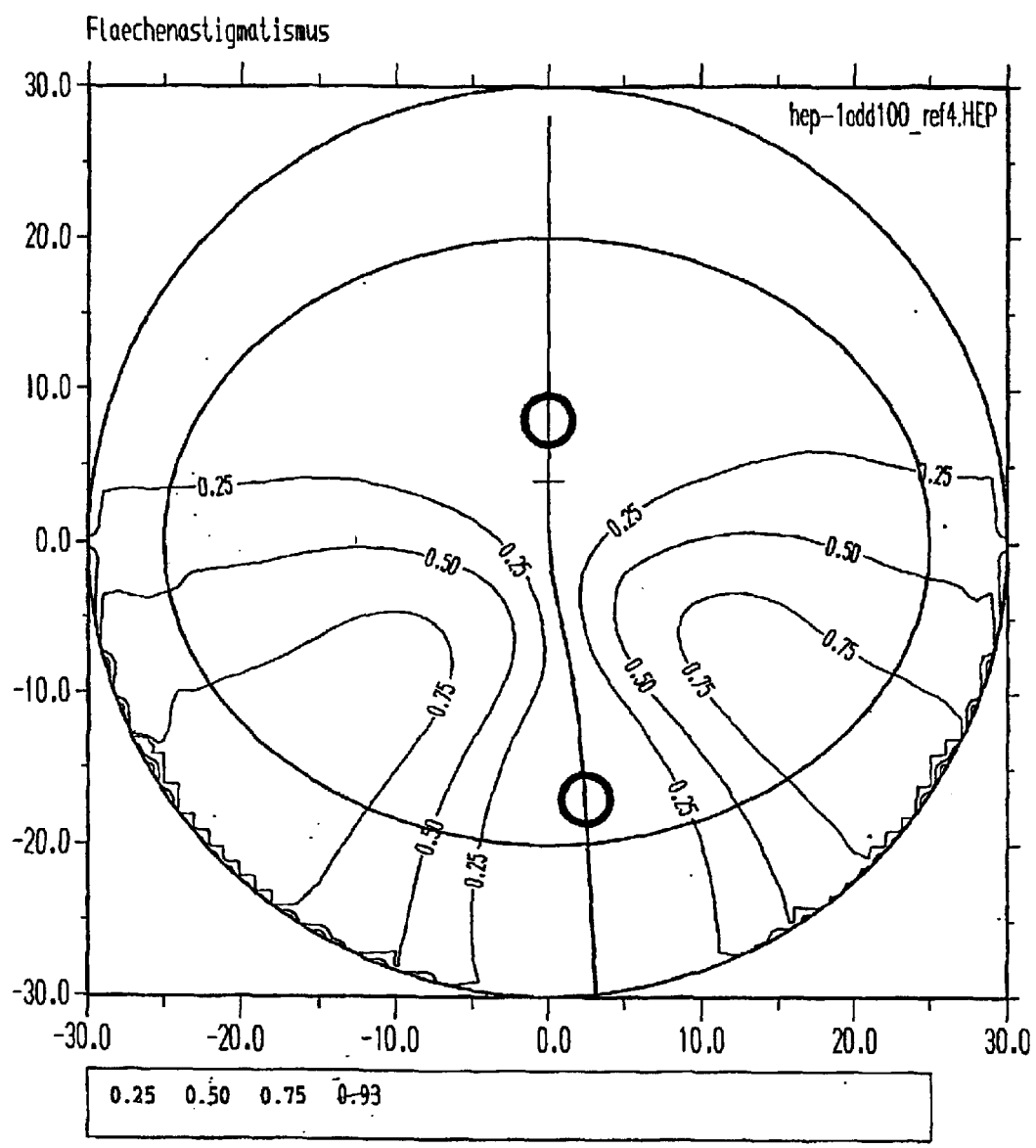
Figure 4D:
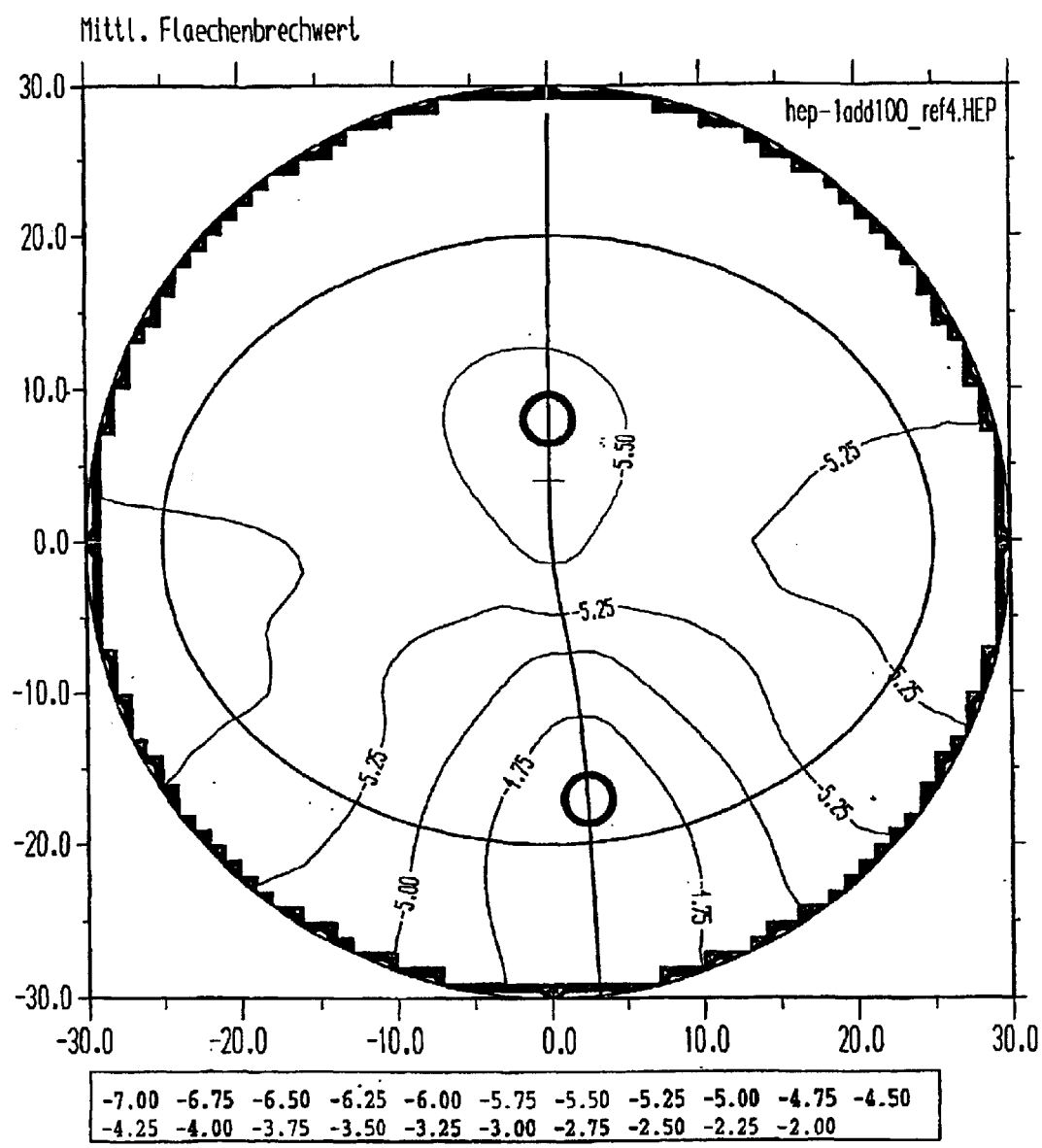
Figure 5A:
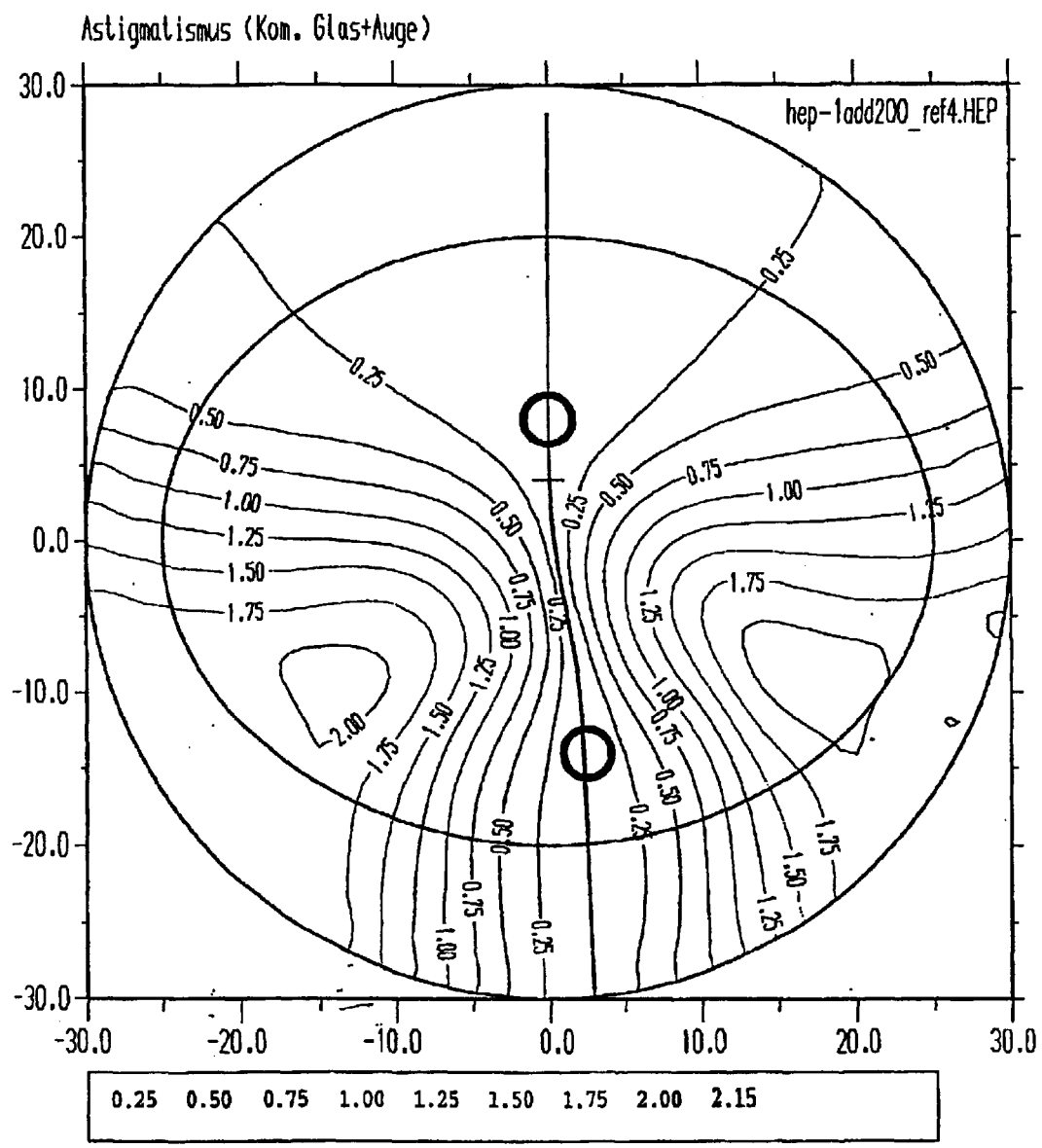
Figure 56:
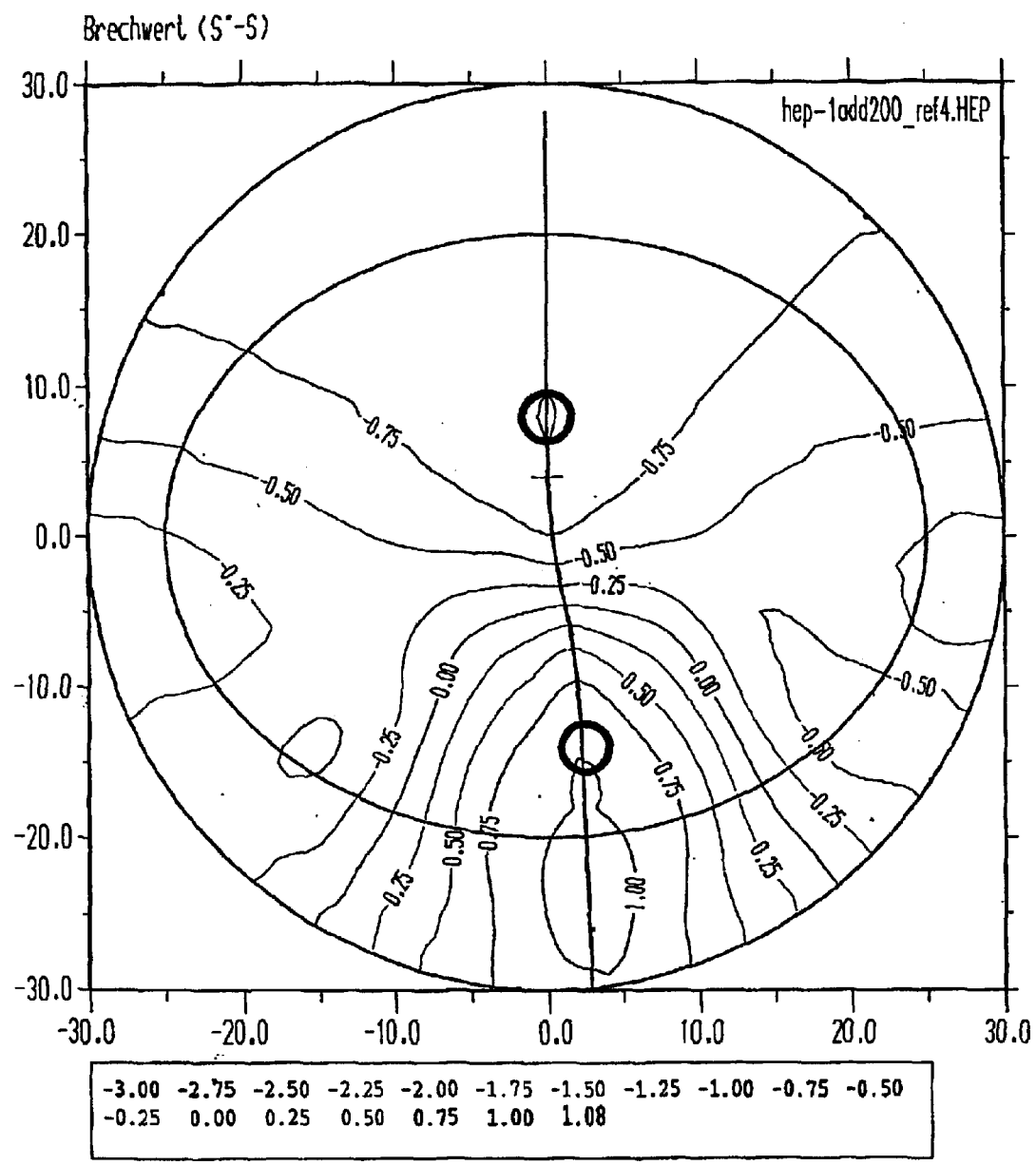
Figure 5C:
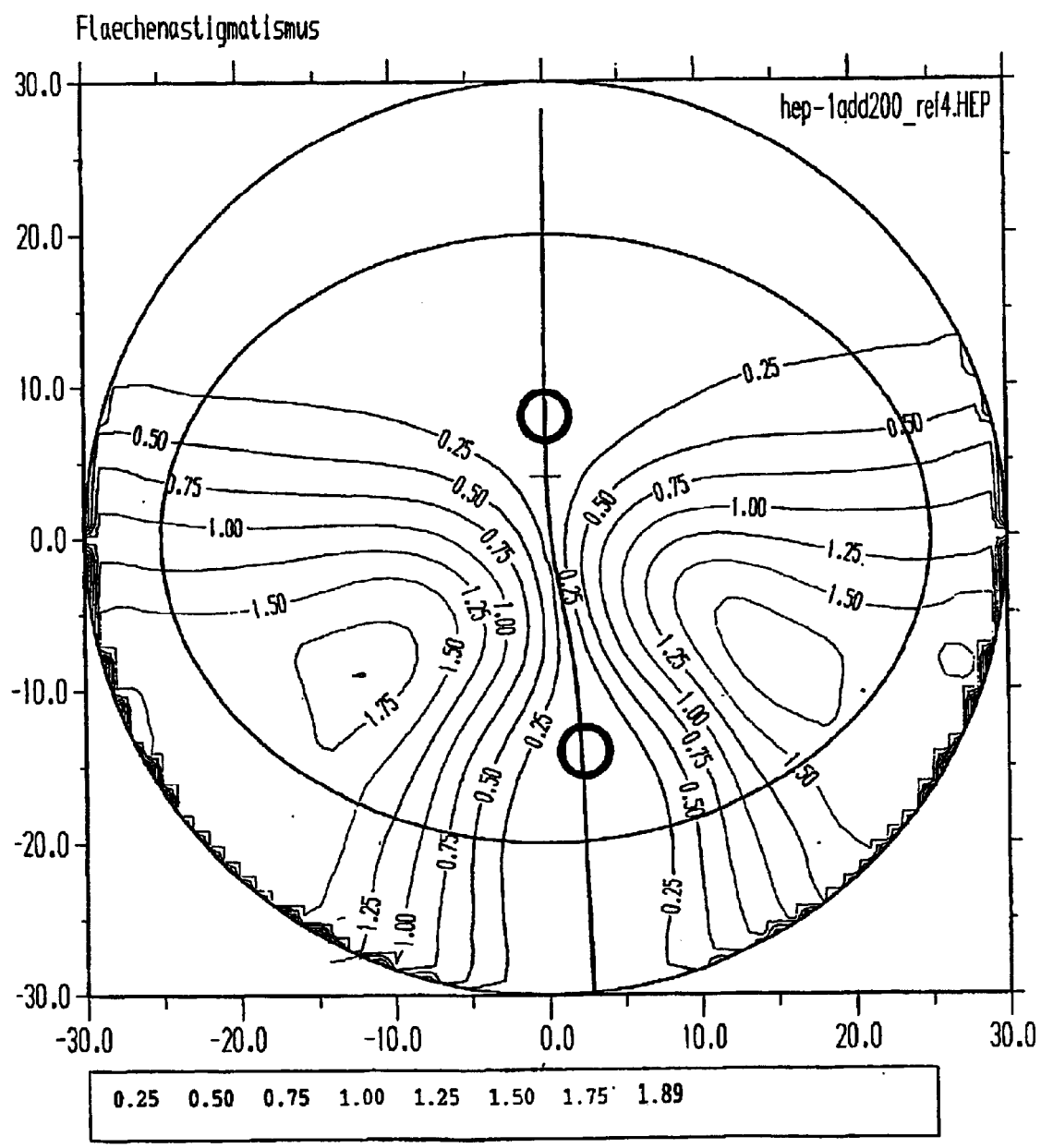
Figure 5D:
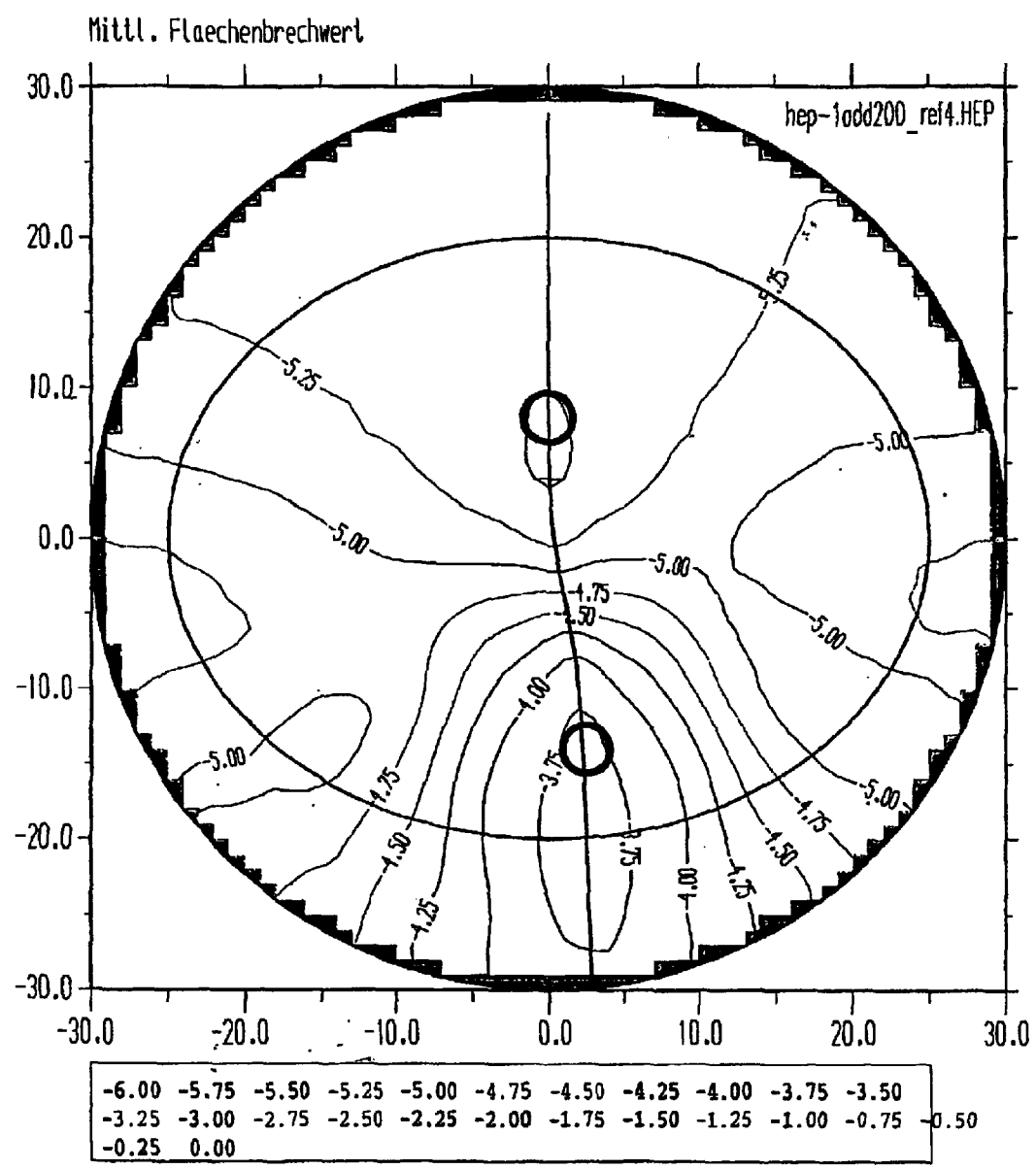
Figure 6A:
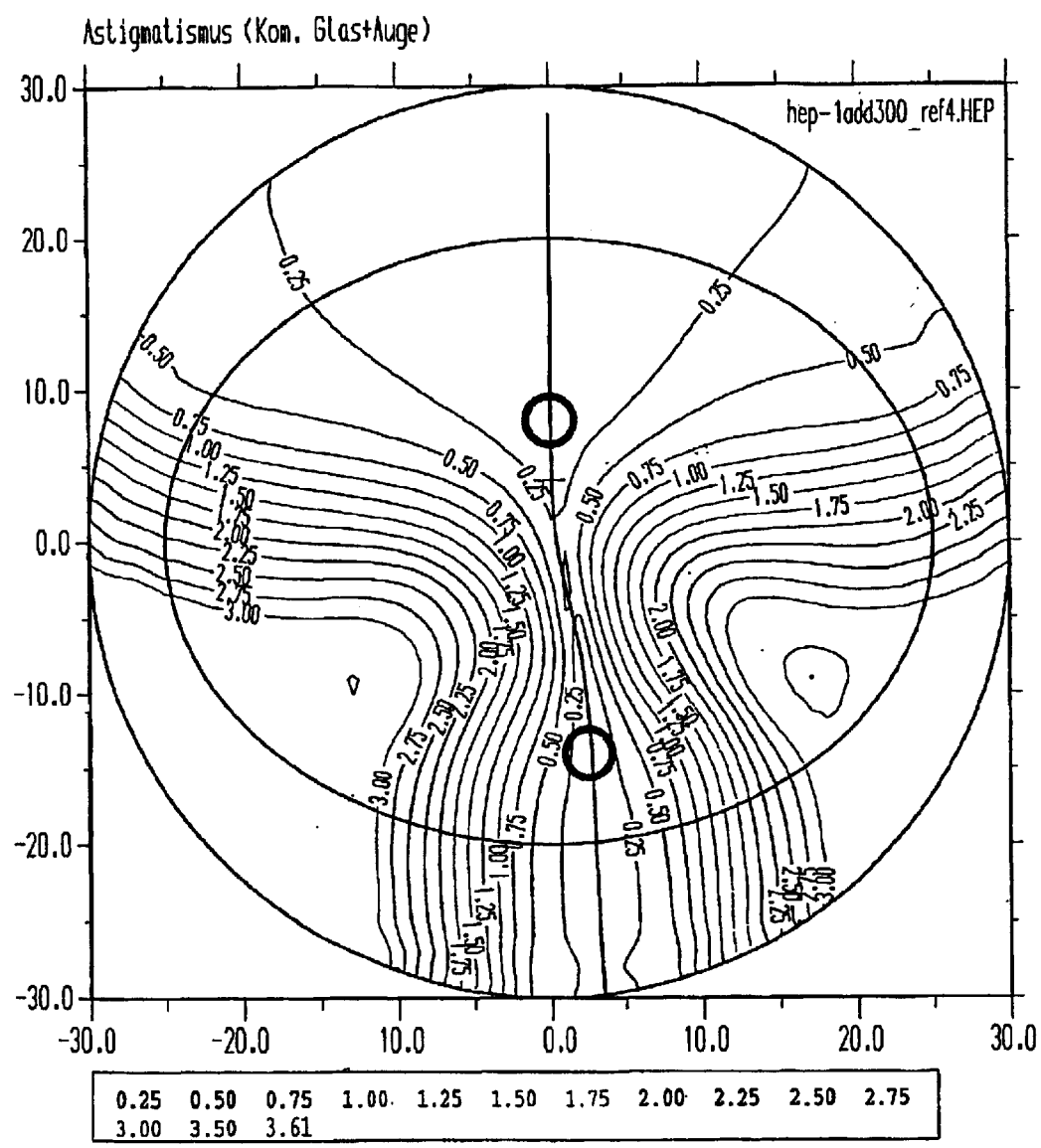
Figure 66:
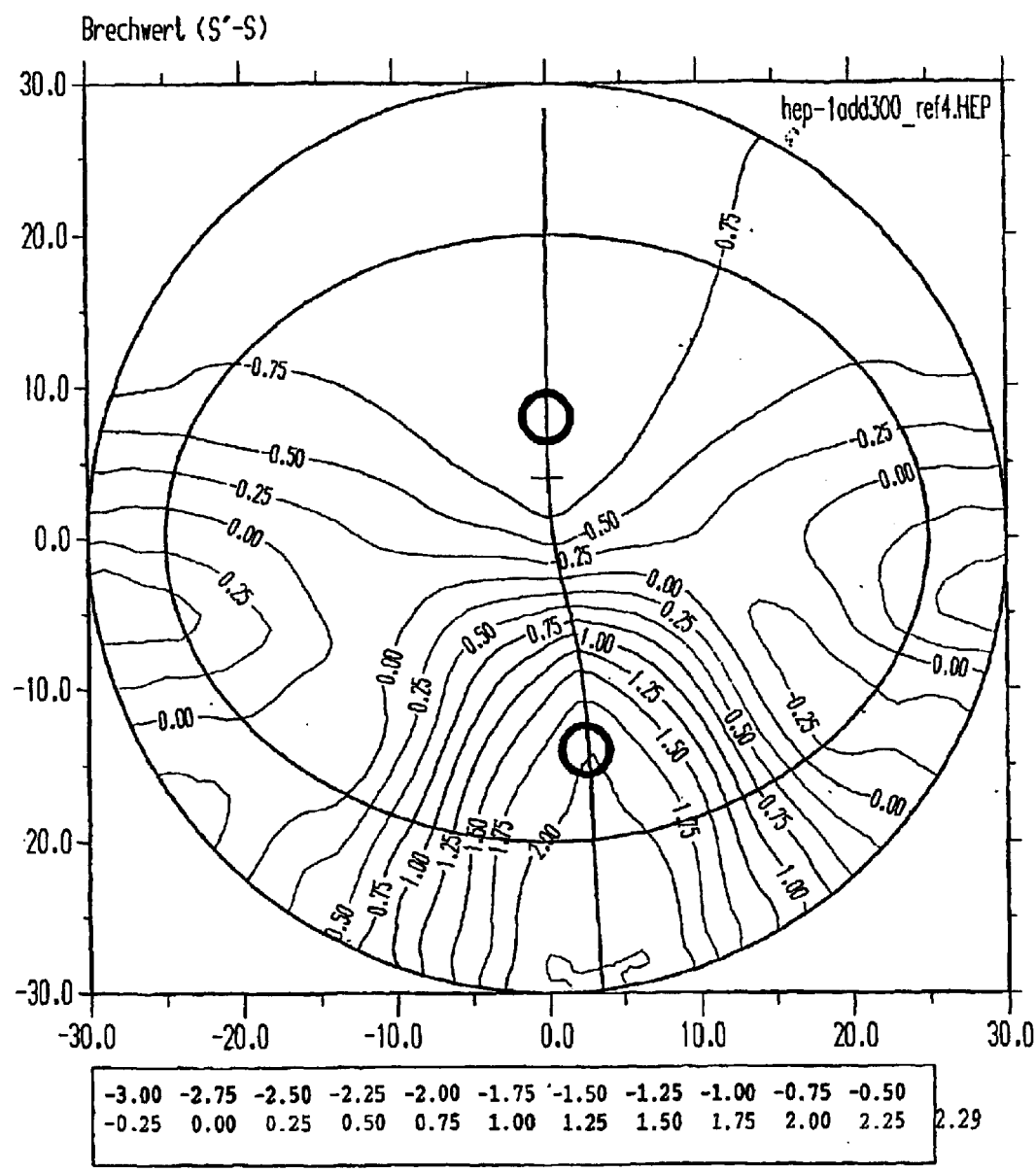
Figure 6C:
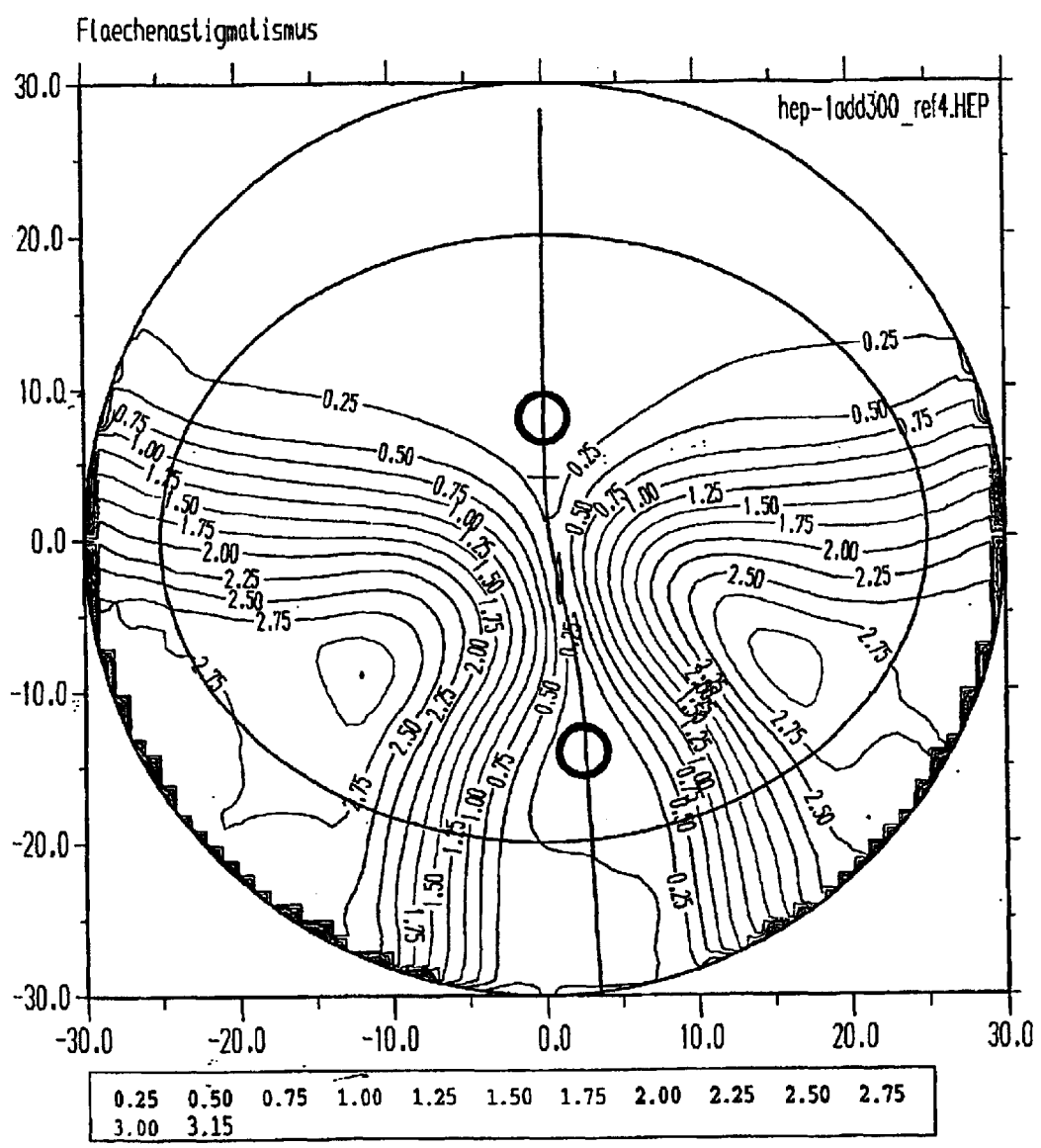
Figure 6D:
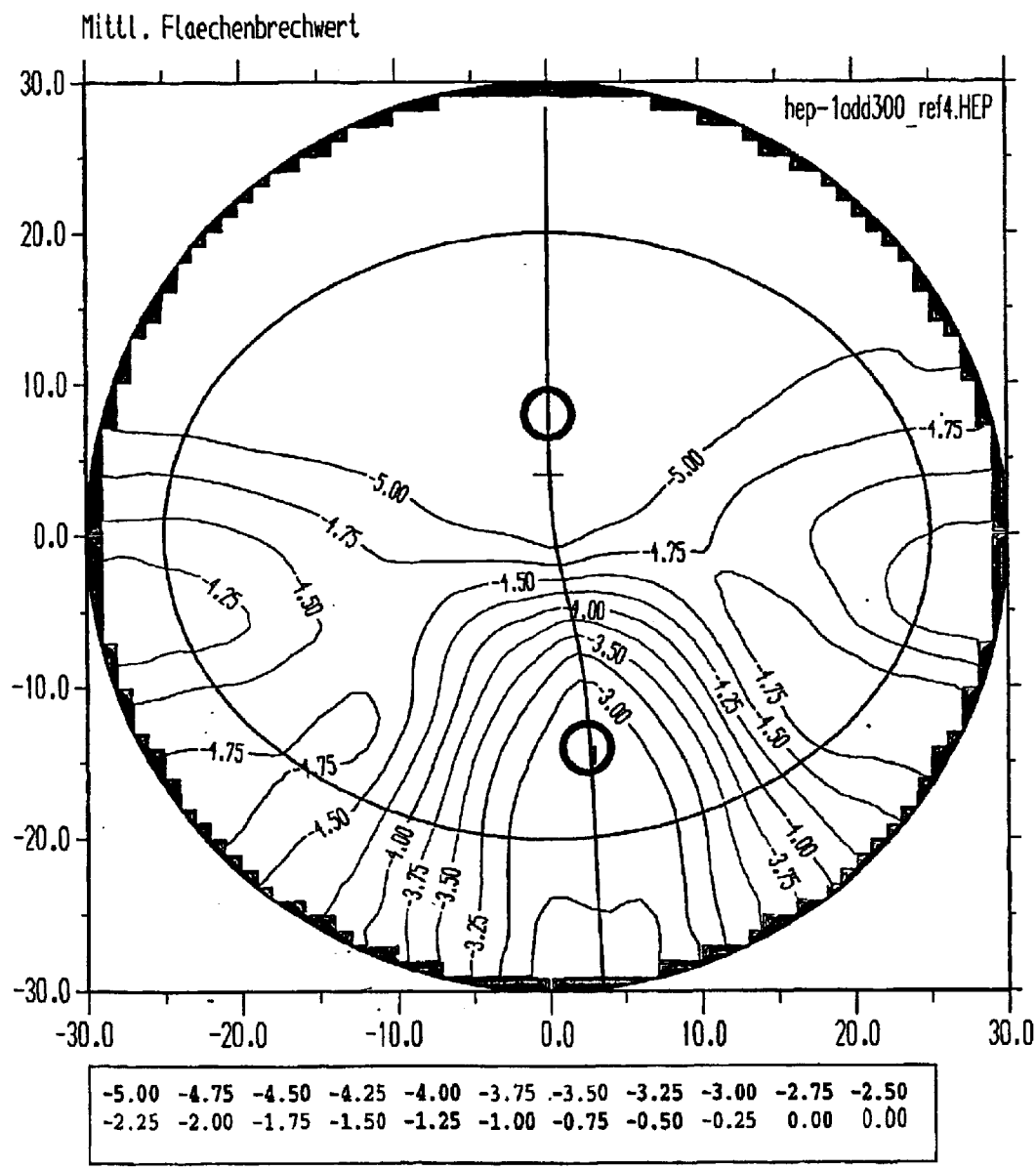
Figure 76:
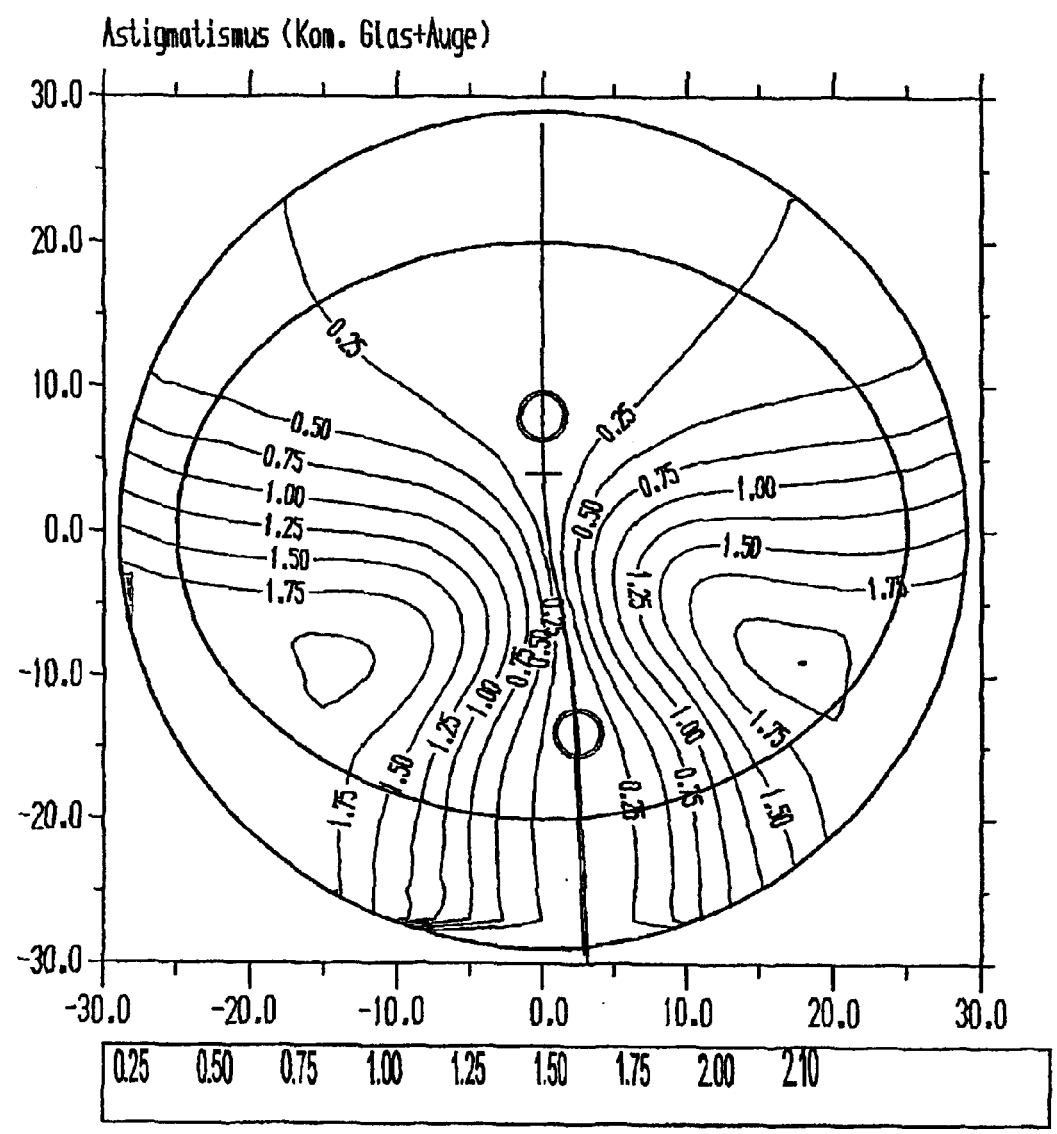

The examples of embodiment illustrated in FIGS. 4 to 6 have a mean "as worn" power of −1.0 dpt in the distance portion; the addition powers are 1, 2 and 3 dpt, respectively.

The distance and near reference points are each represented by means of a circle, and the centration point is designated with a cross—their positions may be seen from the respective Figures. Furthermore, the course of the principal line which has been determined in accordance with the invention has been drawn.

The partial Figures a of the FIGS. 1 to 6 show the astigmatic deviation within a circle of radius 30 mm around a point lying 4 mm below the so-called centration point. The astigmatic deviation is the "residual astigmatism" of the system spectacle lens/eye and is illustrated by means of so-called iso-lines, beginning with the iso-line 0.25 dpt. The iso-lines show the deviation of the astigmatism with respect to magnitude and cylinder axis from the cylindrical prescription—and is 0 dpt in the case of an astigmatism-free eye.

The partial Figures b show in a corresponding manner the iso-lines of the mean "as worn" power of these examples of embodiment of the invention. The mean "as worn" power D is the mean value of the reciprocals of the image side focal intercepts S'1 and S'2 minus the object distance, i.e. the object side focal intercept S:

$$D=0.5\cdot(S'1+S'2)-S$$

and is likewise shown in the form of so-called iso-lines beginning with the iso-line 0.75 dpt.

In corresponding manner the iso-lines of the surface data, namely the surface astigmatism and the mean surface power are shown in the partial Figures c and d. For a definition of these surface data reference is made to the introductory explanations.

FIGS. 1 to 6 show that both the distance portion and the near portion are relatively large. Furthermore, in the distance portion the mean "as worn" power hardly increases towards the periphery and decreases only a little in the near portion. The maximum astigmatic deviation is very small, and the difference between the maximum nasal and temporal deviation is insignificant.

It is common to all four examples of embodiment illustrated in FIGS. 7 to 10 that they have a spherical power (mean "as worn" power) in the distance reference point of −1 dpt and an addition power of 2 dpt. There is no astigmatic prescription. In all Figures the abscissa (x axis) is the horizontal axis and the ordinate (y axis) is the vertical axis in the wearing position.

The near and distance reference points are each shown by circles in the respective Figures b-e, and the centration point is designated by a cross—their positions may be seen in the respective Figures. Furthermore, the shape of the principal line which has been determined in accordance with the invention has been drawn.

The partial Figures a indicate the vertex heights of the progressive eye-side surface for the respective embodiments. Vertex height is understood to be the distance of a point having the coordinates x and y (horizontal and vertical axis, respectively, in the wearing position of the spectacle lens) from the tangential plane of the surface vertex. In each of the Tables the left-hand column shows the y values (from −20 to +20 mm) and the top line shows from column 2 onwards the x values (from −20 to +20 mm). The vertex heights are also given in mm. The value 0 means that no vertex height is given for these x, y coordinates.

The partial Figures b of the FIGS. 7 to 10 show the astigmatic deviation within a circle of radius 30 mm around a point lying 4 mm below the so-called centration point. The astigmatic deviation is the "residual astigmatism" of the system spectacle lens/eye and is shown by means of so-called iso-lines beginning with the iso-line 0.25 dpt. The iso-lines indicate the deviation of the astigmatism with respect to magnitude and cylinder axis from the cylindrical prescription—which in the case of an astigmatism-free eye is 0 dpt.

The partial Figures c show in corresponding manner the iso-lines for the mean "as worn" power of this embodiment of the invention. The mean "as worn" power D is the mean value of the reciprocals of the image side focal intercepts S'1 and S'2 minus the object distance, i.e. the object side focal intercept S:

$$D=0.5\cdot(S'1+S'2)-S$$

and is also shown in the form of so-called iso-lines, beginning with the iso-line 0.75 dpt.

In corresponding manner the iso-lines of the surface data, namely the surface astigmatism and the mean surface power are shown in the partial Figures d and e. For a definition of these surface data, reference is made to the introductory explanations.

Figure 7C:
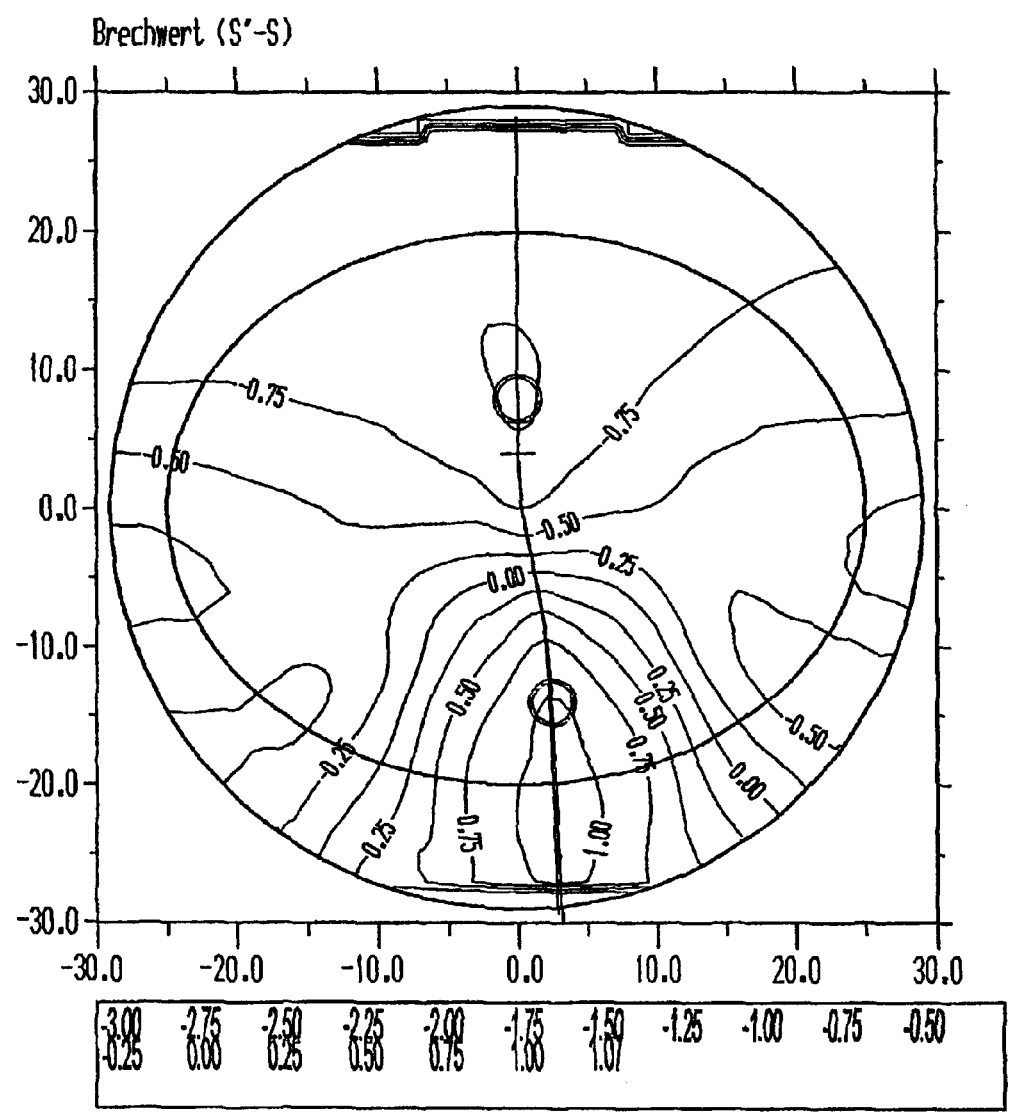
Figure 7D:
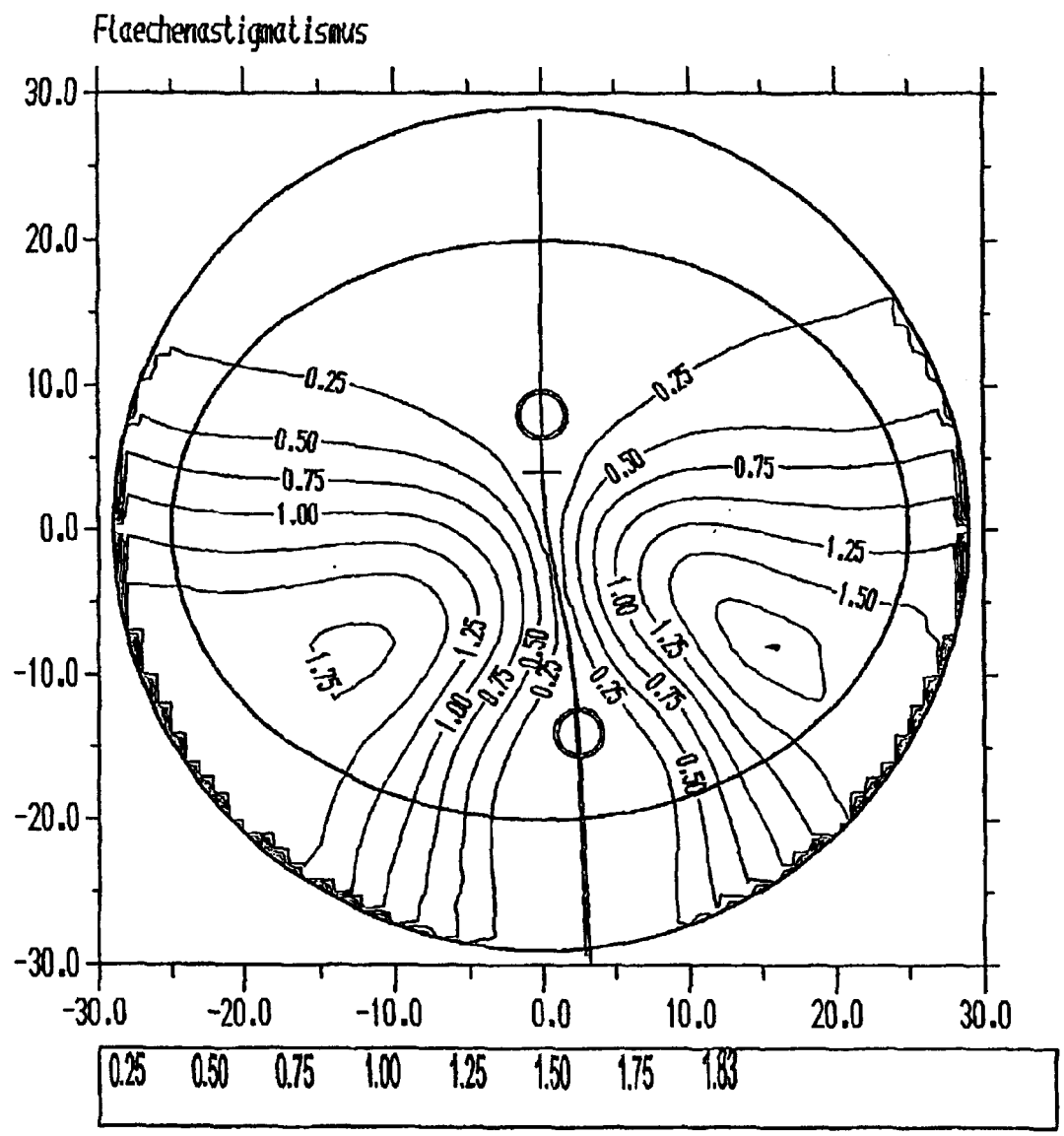
Figure 7E:
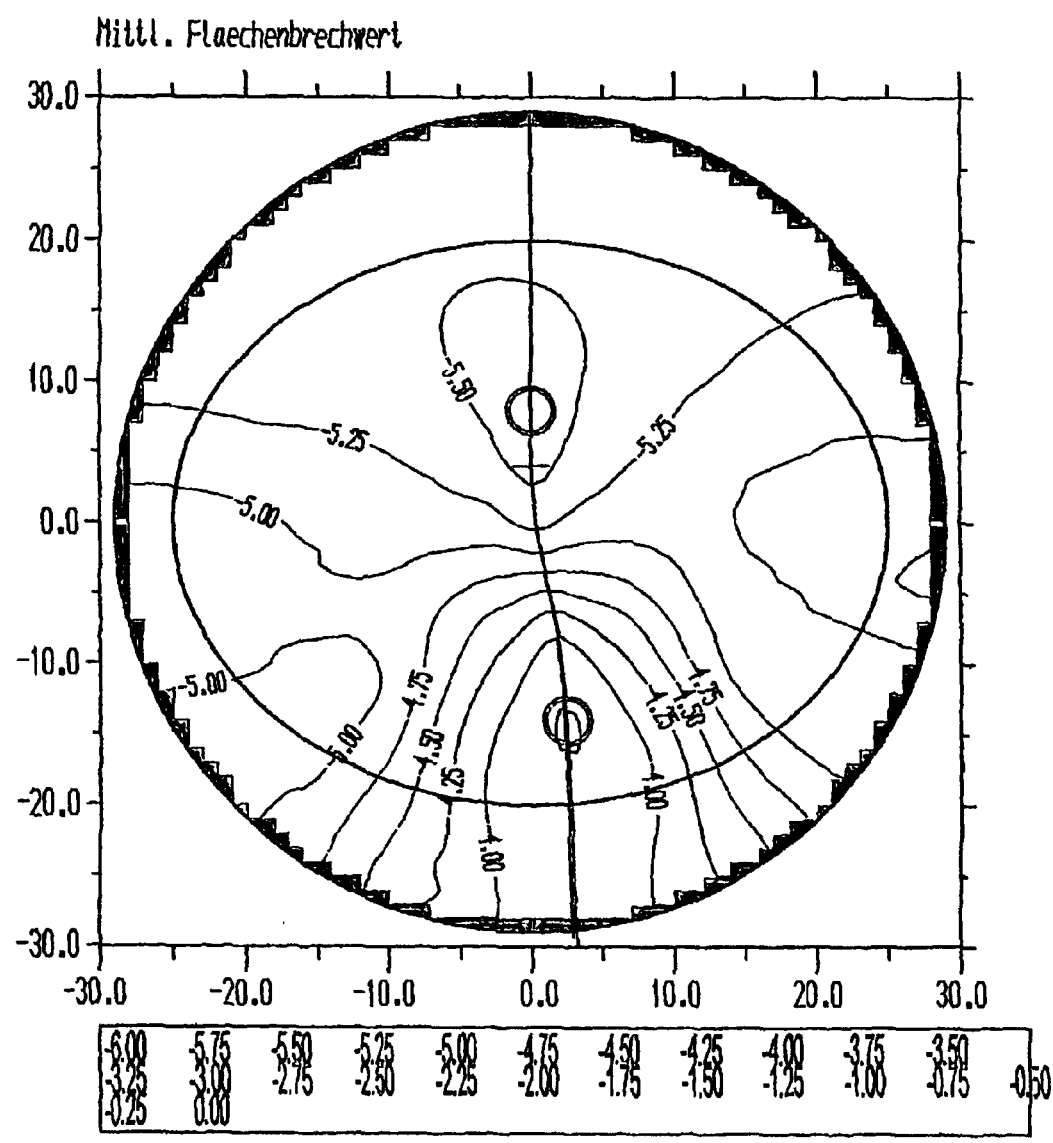
Figure 86:
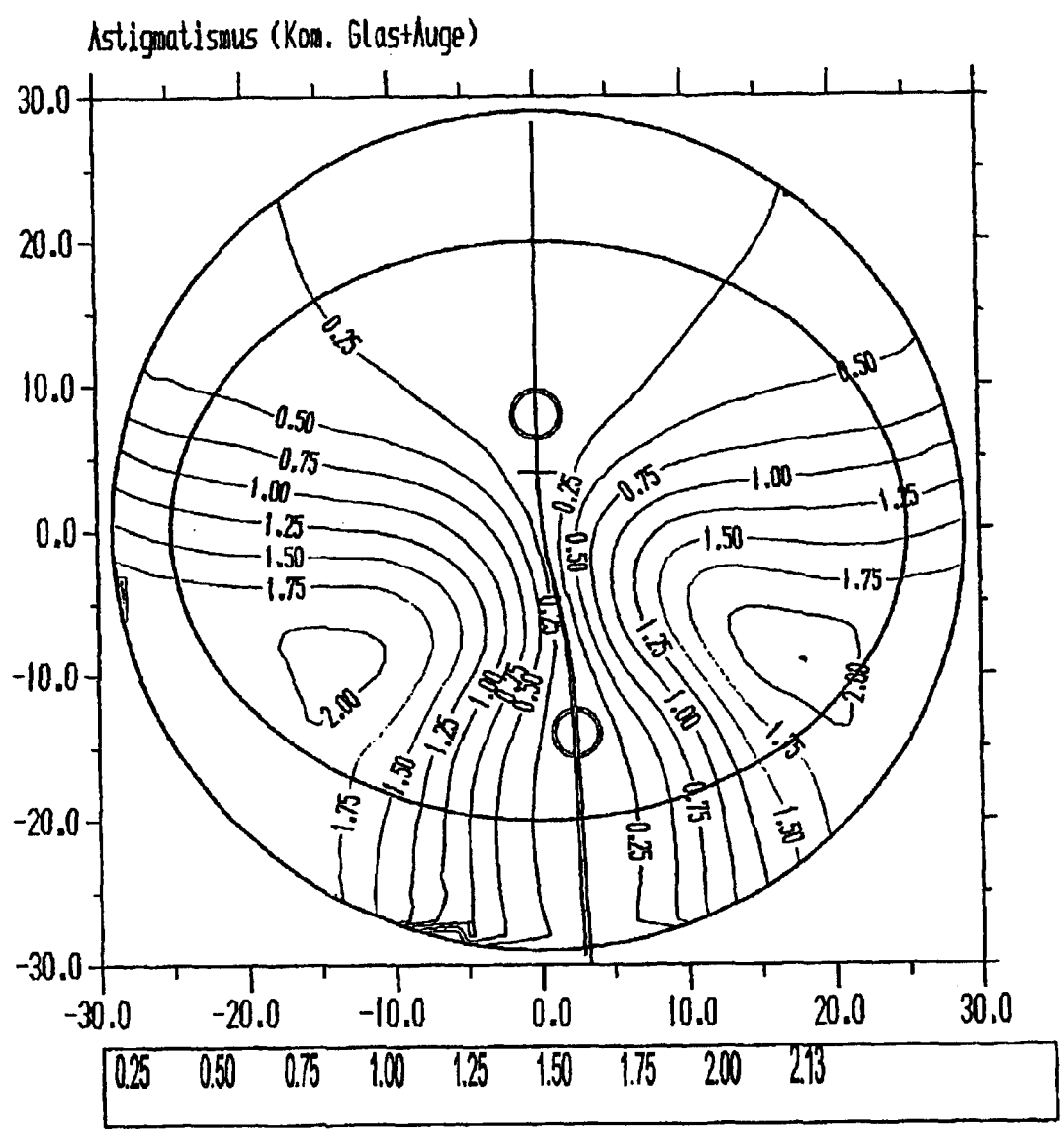
Figure 8C:
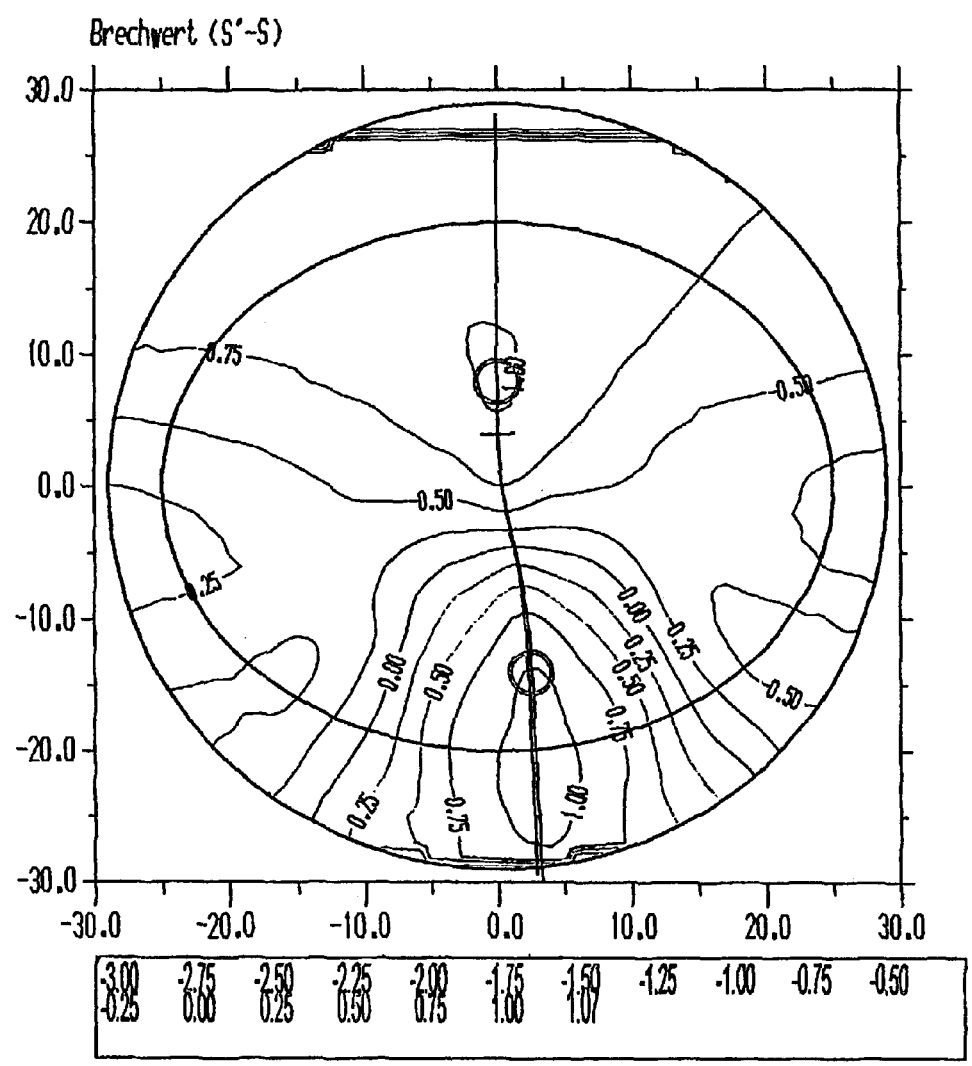
Figure 8D:
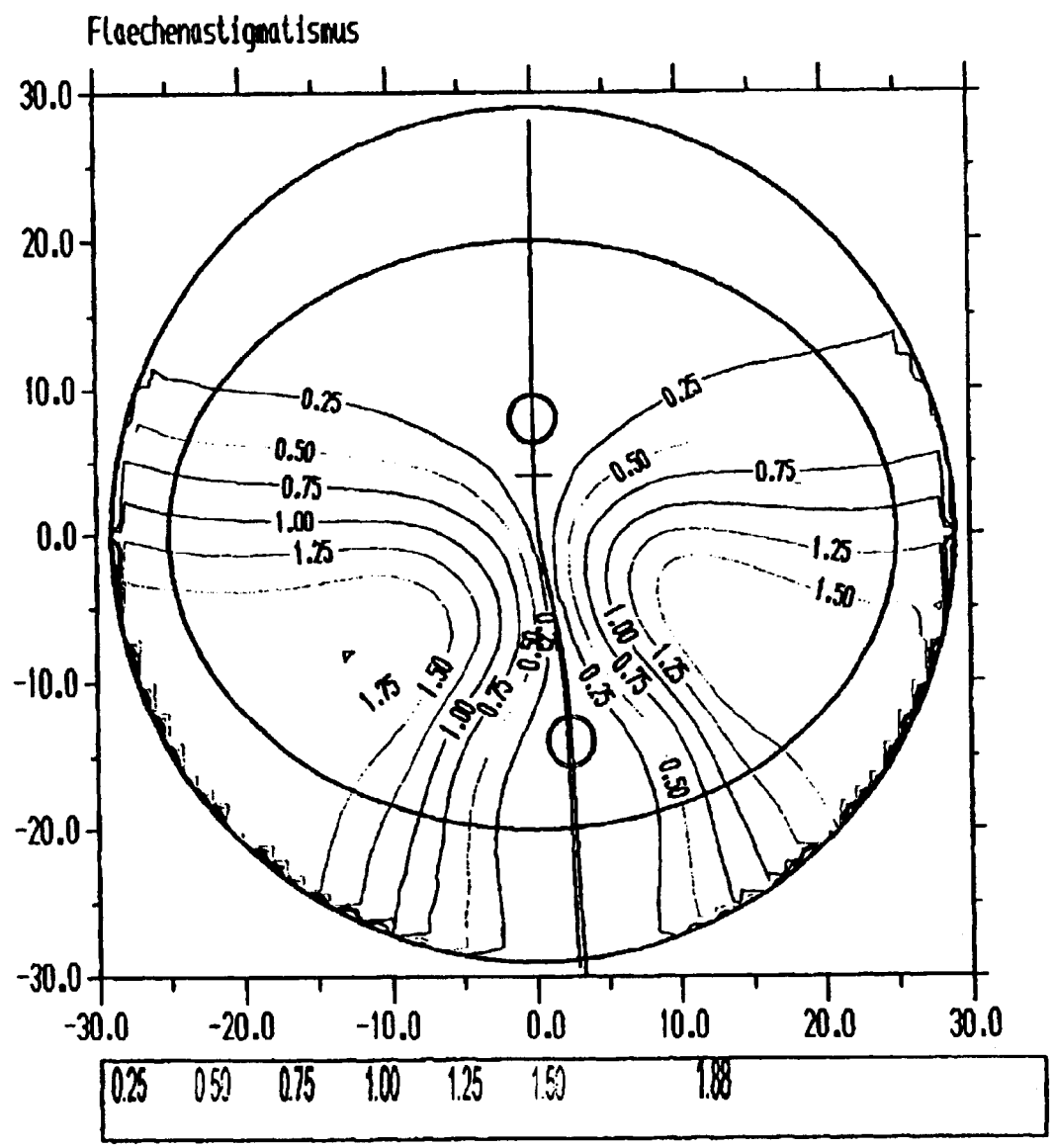
Figure 8E:
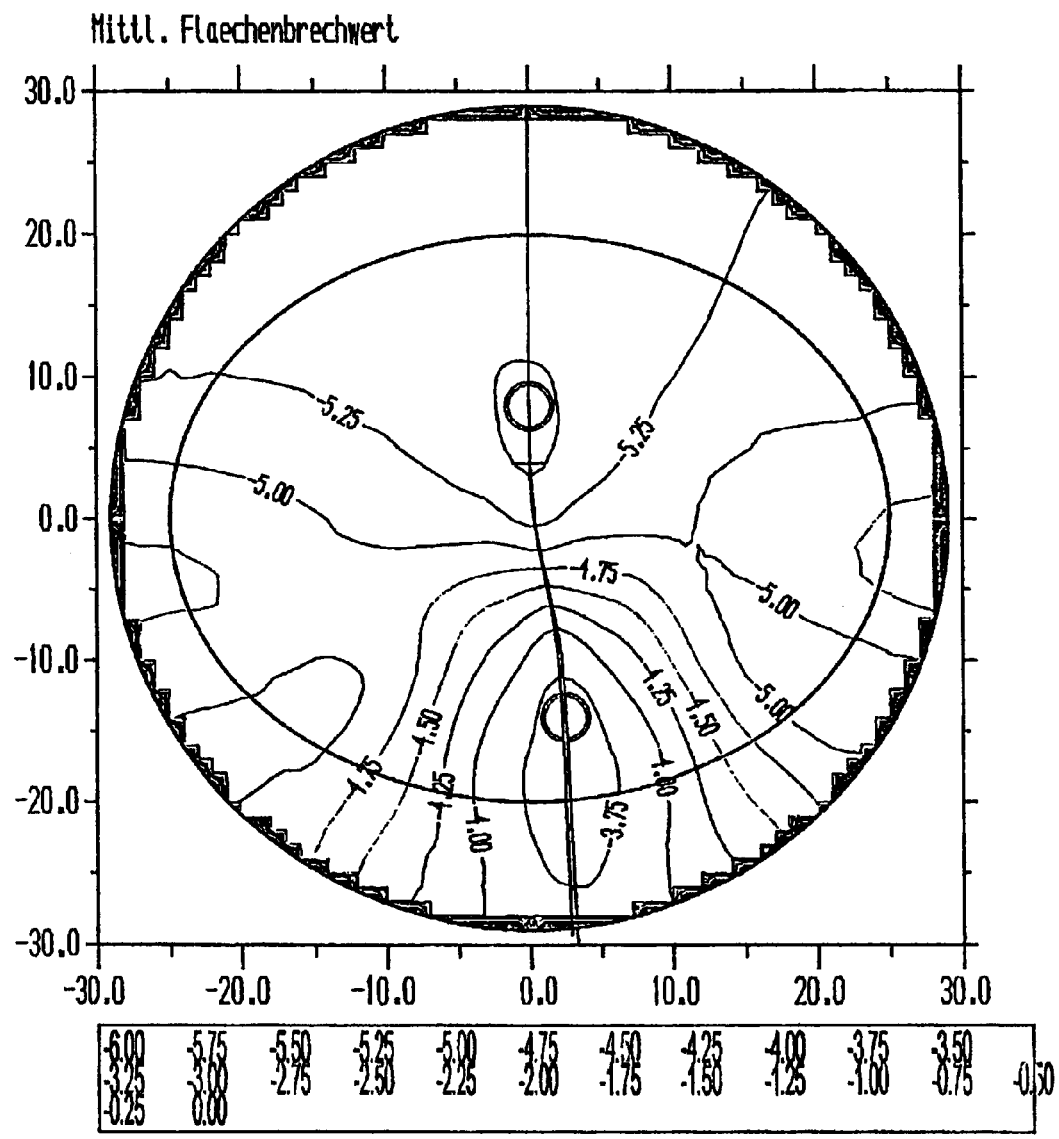
Figure 9B:
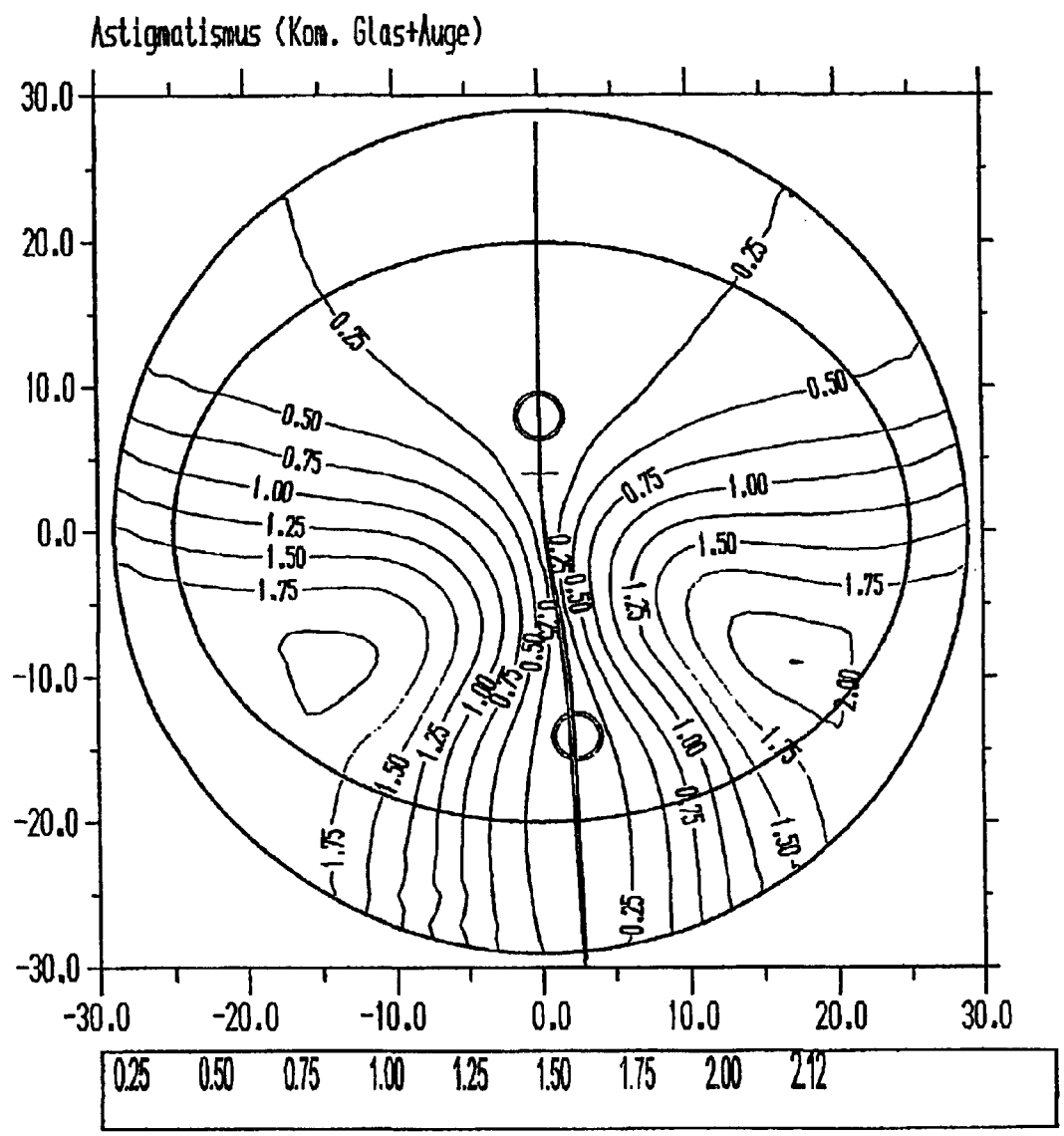
Figure 9C:
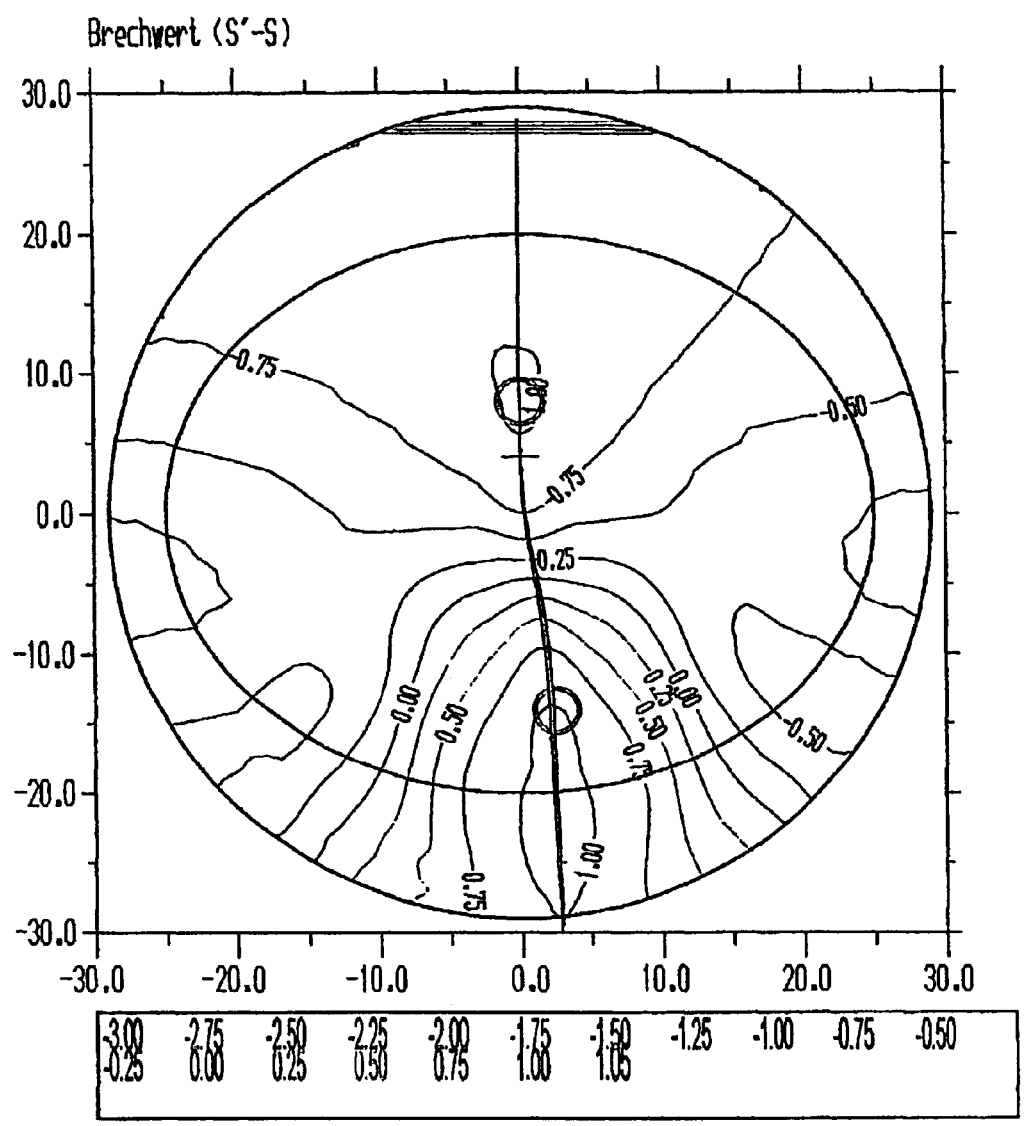
Figure 9D:
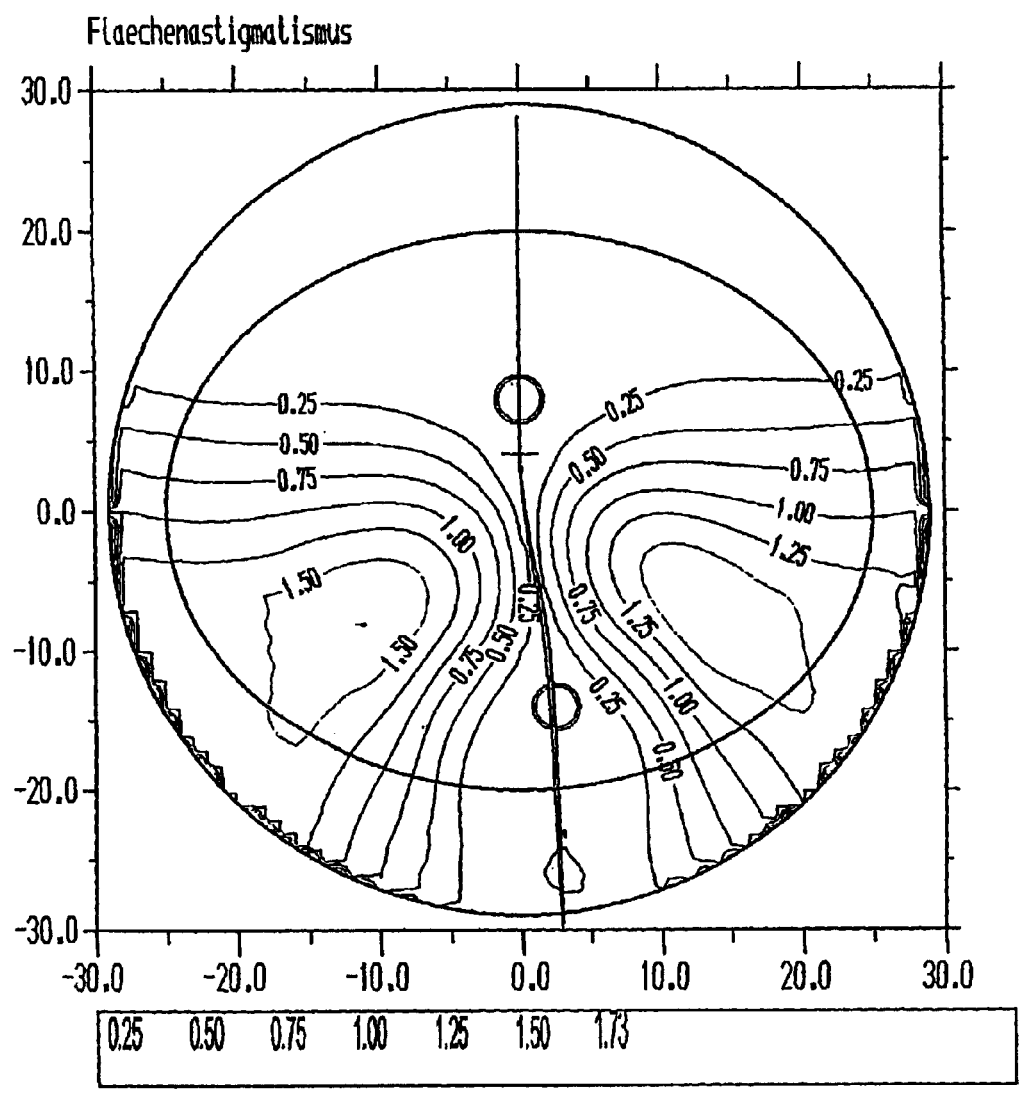
Figure 9E:
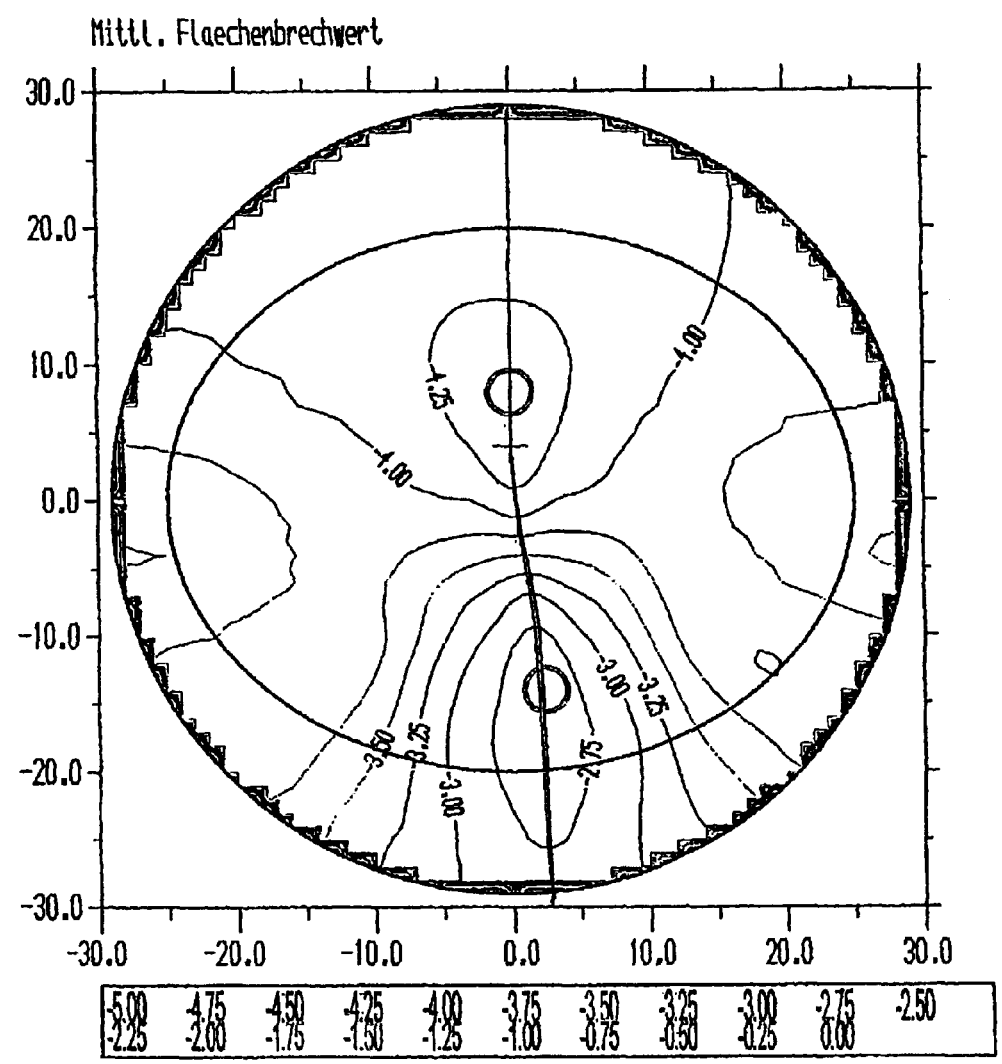
Figure 106:
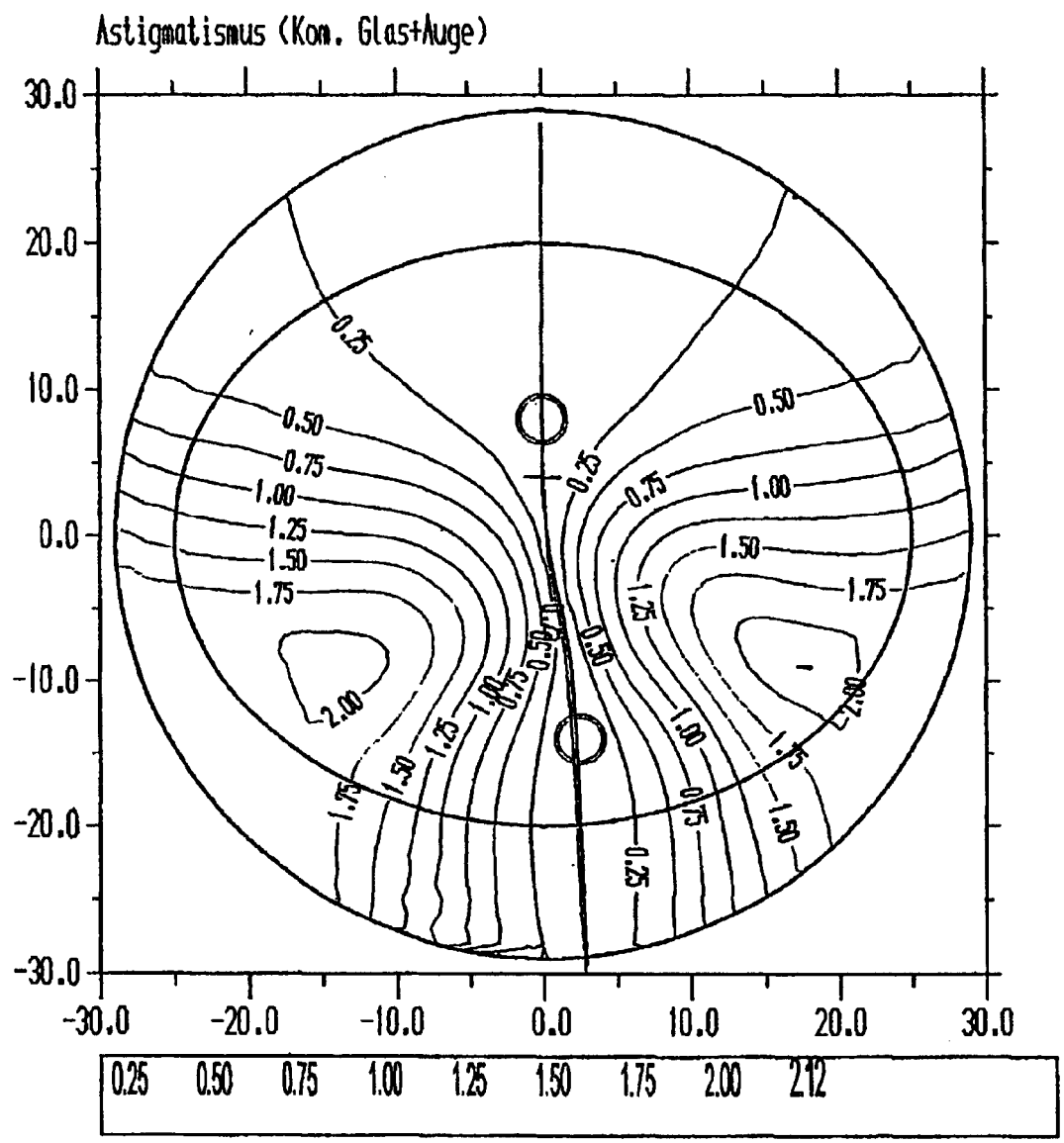
Figure 10C:
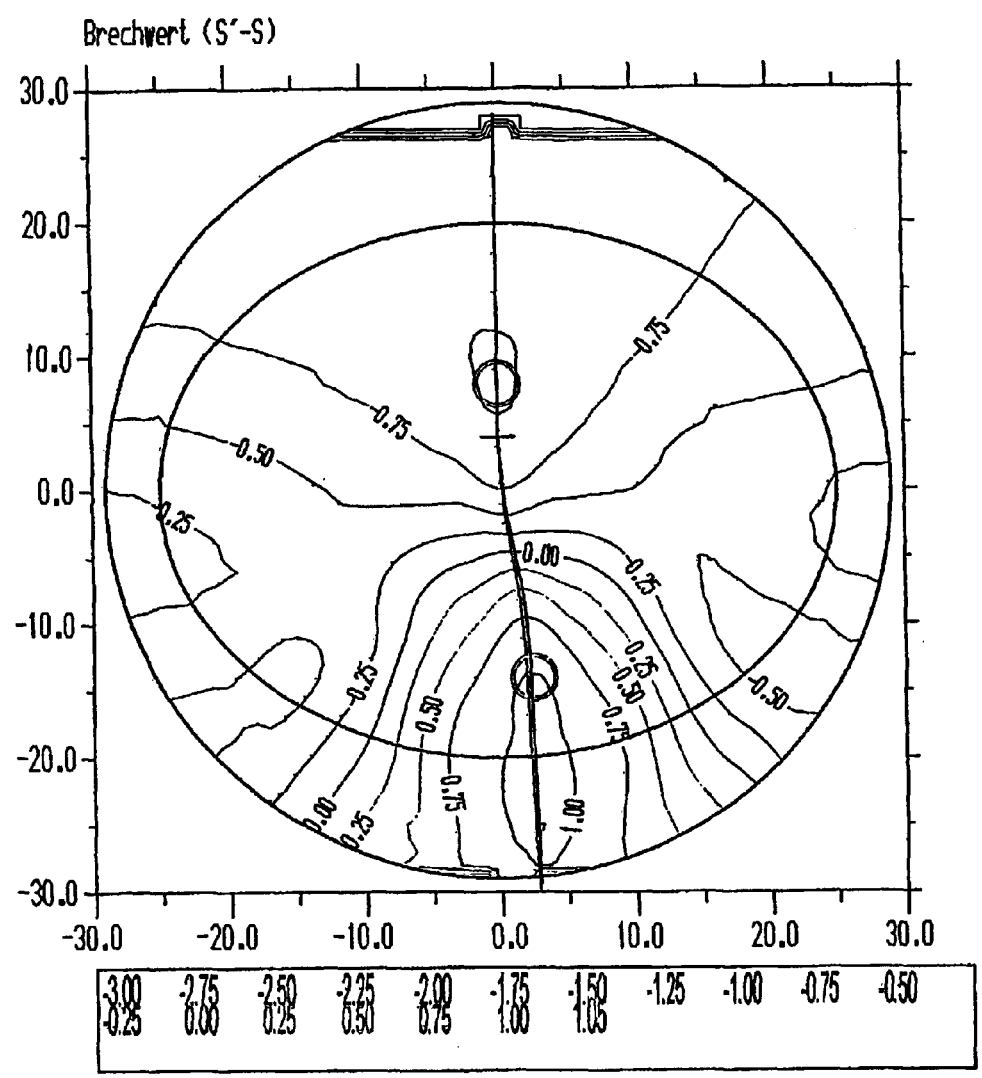
Figure 10D:
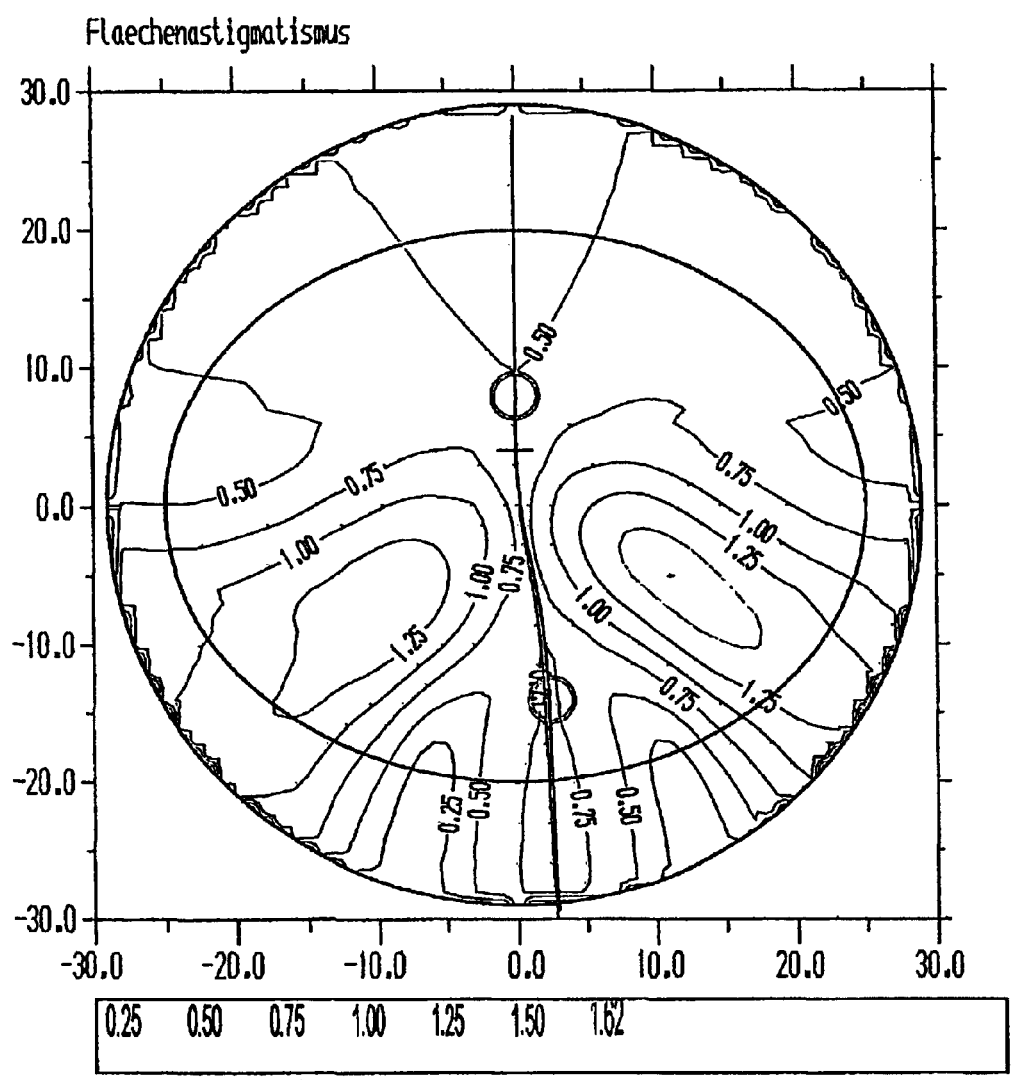
Figure 10C:
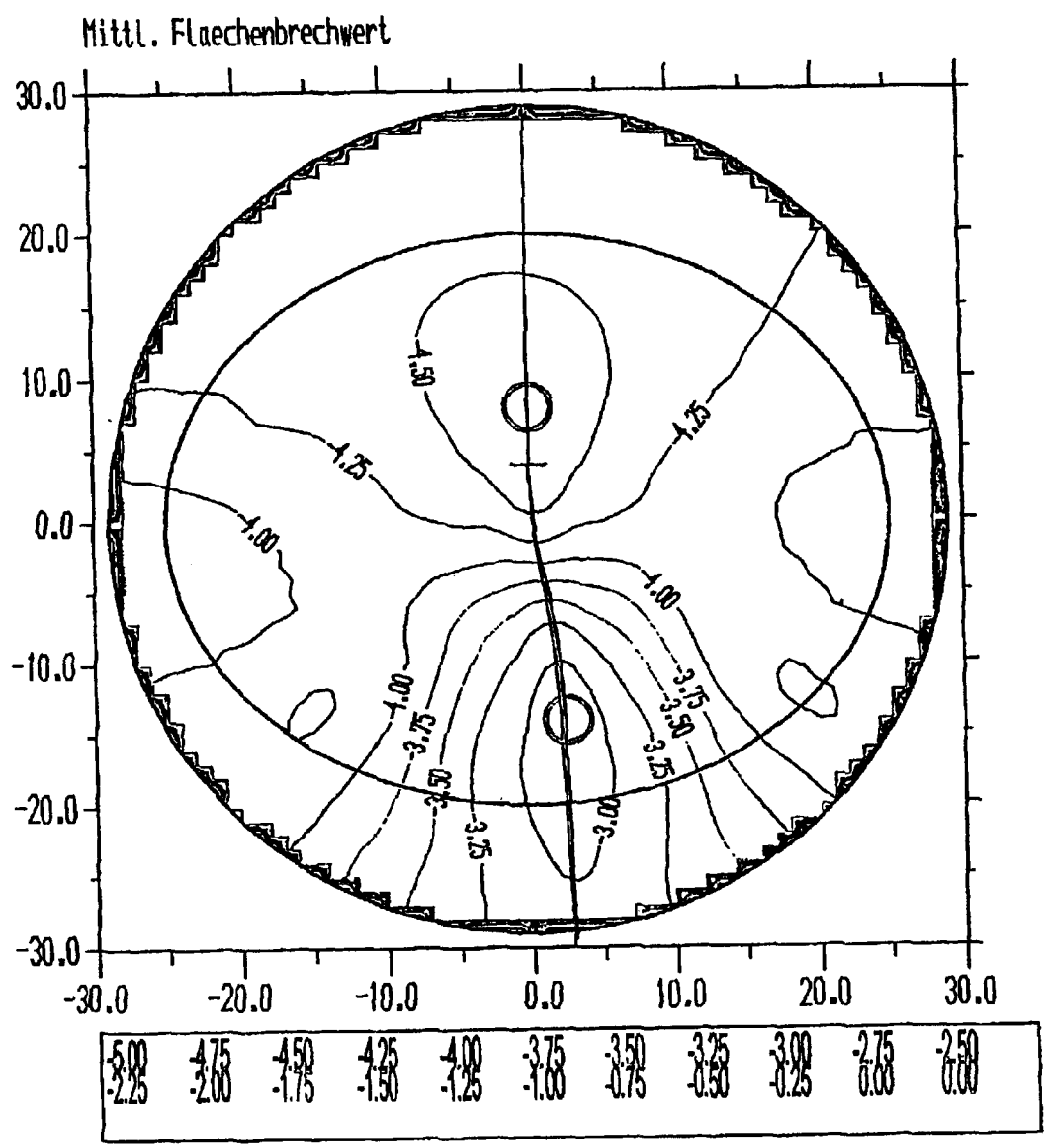

The examples illustrated in FIGS. 7 to 10 have the following individual conditions when being worn:

| Example | FIG. 7 | FIG. 8 | FIG. 9 | FIG. 10 |
|---|---|---|---|---|
| D1x | 4.55 | 4.55 | 3.41 | 3.41 |
| D1y | 4.55 | 4.55 | 3.41 | 3.98 |
| n | 1.597 | 1.597 | 1.597 | 1.597 |
| D | 1.59 | 1.59 | 1.59 | 1.59 |
| DRP | 1.0 | 1.0 | 1.0 | 1.0 |
| PD | 63 | 71 | 63 | 63 |
| HAS | 15 | 15 | 10 | 10 |
| Pantoscopic Angle | 0 | 8 | 8 | 8 | wherein:

D1x is the power of the front surface in x direction (dpt)
D1y is the power of the front surface in y direction (dpt)
n is the refractive index of the glass material
d is the center thickness of the spectacle lens in mm
DRP is the prism thinning in cm/m
PD is the interpupillary distance
HSA is the vertex distance in mm
The pantoscopic angle of the spectacle lens is given in degrees.

Despite the individualized conditions during wearing, and the surface astigmatism of the front surface which was introduced in the example according to FIG. 10 for reasons of appearance, the iso-lines in the wearing position practically do not differ from each other, although the surface values partly differ distinctly.

Of course, the methods of the invention may also be used for computing and manufacturing spectacle lenses having two progressive surfaces and/or having (in addition) a varying refractive index.

What is claimed is:

1. Method for computing a spectacle lens, said lens comprising a region (distance portion) designed for viewing at large distances and in particular "to infinity";

a region (near portion) designed for viewing at short distances and in particular "reading distances"; and a progressive zone disposed between the distance portion and the near portion, in which the power of the spectacle lens increases, from a value at a distance reference point located in the distance portion to a value at the near reference point located in the near portion along a curve (principal line) veering towards the nose, by an amount designated as addition power;

comprising the following steps:

a. stipulating as initial parameters a course of a projection $x_0(y)$ of the principal line on an x,y plane, and also properties of the spectacle lens along the principal line whilst taking into account spherical, cylindrical, and possibly also prismatic prescription values and the addition power, as well as an interpupillary distance, and computing with these stipulations at least one strip of second order on a progressive surface of the spectacle lens;

b. stipulating an object-distance function Al(y) which describes a change of object distance with a movement, in particular a lowering, of a glance;

c. determining on each horizontal meridian of the progressive spectacle lens a point of penetration of a principal ray through the progressive surface, for which point a distance of a point of intersection of this principal ray with a plane which bisects the interpupillary distance is equal to the object distance given by the object-distance function Al(y);

d. computing for the entirety of these points of penetration lying on the principal viewing line a course of the projection $x'_0(y)$ on the x,y plane;

e. equating the course $x_0(y)$ to $x'_0(y)$ and checking the coincidence;

f. subsequently iteratively repeating the steps a. to e. until the projection $x_0(y)$ of the principal line is equal (within given limits) to the course of the principal viewing line projection $x'_0(y)$ used for the computation of the respective surface.

2. Method according to claim 1, wherein the stipulated properties of the spectacle lens are surface properties.

3. Method according to claim 2, wherein the surface properties are a surface astigmatism $A_0(y)$ and a surface power $D_0(y)$.

4. Method according to claim 2, wherein a vertex height z and derivatives $\delta z/\delta x$ and $\delta z/\delta y$ at a certain position on the principal line are stipulated as initial conditions.

5. Method according to claim 1, wherein the stipulated properties of the spectacle lens are properties in a wearing position.

6. Method according to claim 5, wherein the stipulated properties are the astigmatism and the power of a combination "spectacle lens/eye".

7. Method according to claim 6, wherein a thickness of the spectacle lens and a prismatic power at a particular position are stipulated as initial conditions.

8. Method according to claim 1, wherein a surface description of a second surface and a refractive index of the spectacle lens are stipulated as further initial conditions.

9. Method according to claim 8, wherein the interpupillary distance, a distance of the center of rotation of the eye and also a pantoscopic angle and a lateral inclination of the spectacle lens are additionally stipulated as initial conditions.

10. Method according to claim 9, wherein these parameters and also the object-distance function Al(y) are stipulated as mean values.

11. Method according to claim 9, wherein these parameters and also the object-distance function Al(y) are stipulated as individually determined data of a prospective spectacles wearer.

12. Method according to claim 11, wherein a shape of an actual spectacle frame and its arrangement in front of the eyes of the spectacles wearer are additionally taken into account.

13. Method according to claim 1, wherein the projection $x_0(y)$ of the principal line and also the stipulated properties are described by cubic or higher order spline functions or a function f(y) of the form $$f(y) = b + a - \frac{a}{(1 + e^{c(y+d)})^m} + \sum_i g_i y^i.$$

14. Method according to claim 1, wherein, starting out from strips of second order for which the principal line coincides with the principal viewing line (at least within given limits), individual horizontal meridians ($y=y_c$) given by $$z(x, y_c) = x_0(y_c) + z_0(y_c) + \sum_{i=1}^{n} a_i \cdot (x - x_0(y_c))^i$$

are computed.

15. Method according to claim 1, wherein, starting out from strips of second order for which the principal line coincides with the principal viewing line (at least within given limits), an entire surface is computed by means of spline functions and usual optimizing methods.

16. Method according to claim 1, wherein the object distance is a distance from a point of penetration of a principal ray through a front surface to a point of intersection of the principal ray with a central plane which bisects the interpupillary distance.

17. Method according to claim 1, wherein the progressive surface is an eye-side surface.

18. Method according to claim 17, wherein a front surface is a spherical or aspherical surface.

19. Method for manufacturing a spectacle lens, casting molds for casting and drop plate type molds or molding plugs for press-forming spectacle lenses from a plastics material, wherein data of a surface computed according to claim 1 are used for manufacturing a progressive surface or a casting mold, a drop plate type mold or a molding plug by means of a surface forming or surface working method.

20. Method according to claim 19, wherein data for a second surface and for an arrangement of the two surfaces relative to each other are used for manufacturing the spectacle lens by working the second surface or for arranging a second casting mold relative to a casting mold for a progressive surface.

* * * * *